(12) United States Patent
Kuno

(10) Patent No.: US 7,860,370 B2
(45) Date of Patent: Dec. 28, 2010

(54) REPRODUCTION APPARATUS FOR SHORTENING A USER'S WAITING TIME UNTIL REPRODUCING A BEGINNING OF A PART THAT THE USER WANTS TO VIEW, AND A REPRODUCTION METHOD AND COMPUTER READABLE RECORDING MEDIUM HAVING A PROGRAM RECORDED THEREON FOR PERFORMING THE SAME

(75) Inventor: Akitoshi Kuno, Kani (JP)

(73) Assignee: Panasonic Corporation, Osaka (JP)

( * ) Notice: Subject to any disclaimer, the term of this patent is extended or adjusted under 35 U.S.C. 154(b) by 1278 days.

(21) Appl. No.: 10/575,786

(22) PCT Filed: Jun. 13, 2005

(86) PCT No.: PCT/JP2005/010788

§ 371 (c)(1),
(2), (4) Date: Apr. 14, 2006

(87) PCT Pub. No.: WO2006/022067

PCT Pub. Date: Mar. 2, 2006

(65) Prior Publication Data

US 2009/0016693 A1    Jan. 15, 2009

(30) Foreign Application Priority Data

Aug. 23, 2004   (JP)   ............................... 2004-241845

(51) Int. Cl.
*H04N 5/76* (2006.01)

(52) U.S. Cl. ....................................................... 386/70

(58) Field of Classification Search .................. 386/52, 386/68–70, 83, 124–126; 369/30.1–30.17
See application file for complete search history.

(56) References Cited

U.S. PATENT DOCUMENTS

| 4,740,938 A | * | 4/1988 | Bierhoff et al. | .......... 369/30.04 |
| 2001/0046190 A1 | * | 11/2001 | Miyazaki | .................. 369/30.15 |
| 2005/0146534 A1 | * | 7/2005 | Fong et al. | .................. 345/619 |

FOREIGN PATENT DOCUMENTS

| JP | 2-11555 | 1/1990 |
| JP | 3-207062 | 9/1991 |
| JP | 9-147534 | 6/1997 |
| JP | 9-212991 | 8/1997 |
| JP | 2001-320677 | * 3/2001 |

* cited by examiner

*Primary Examiner*—David E Harvey
(74) *Attorney, Agent, or Firm*—Wenderoth, Lind & Ponack, L.L.P.

(57) ABSTRACT

A reading control section 40 reproduces information read from a recording medium, and a reproduction-operation section 20 accepts an instruction for a forward skip or a backward skip. Further, a controller 10 makes the skip time for one of the forward skip and the backward skip longer than the skip time for the other, determines the skip time based on one of the instruction for the forward skip and the instruction for the backward skip, and if the instruction for the forward skip and the backward skip is accepted while the information is reproduced, then stops the reproduction, moves the position in which the information is read by the skip time determined by a skip-time determination section 11, and resumes the reproduction after the movement of the reading position is completed.

15 Claims, 15 Drawing Sheets

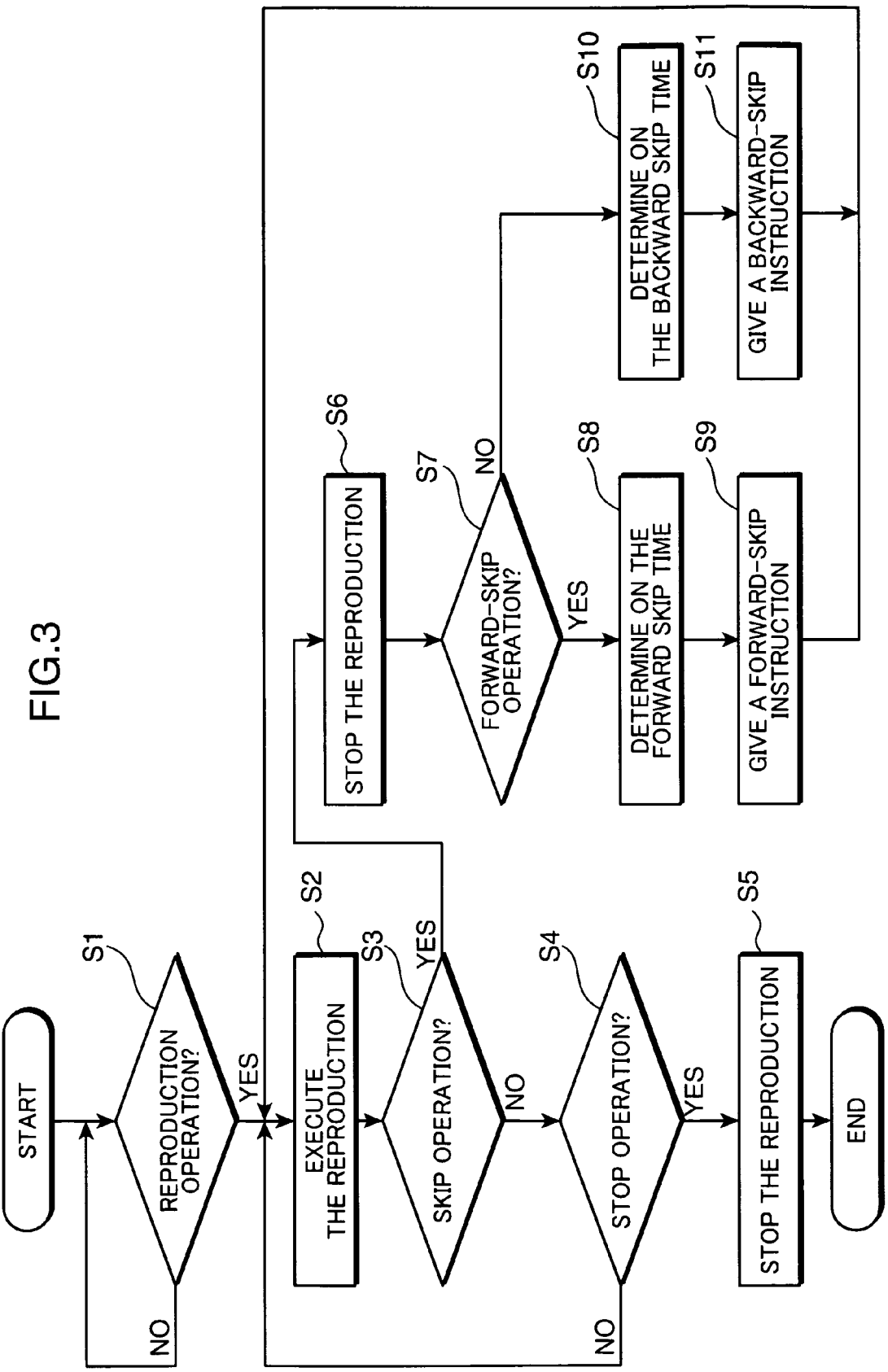

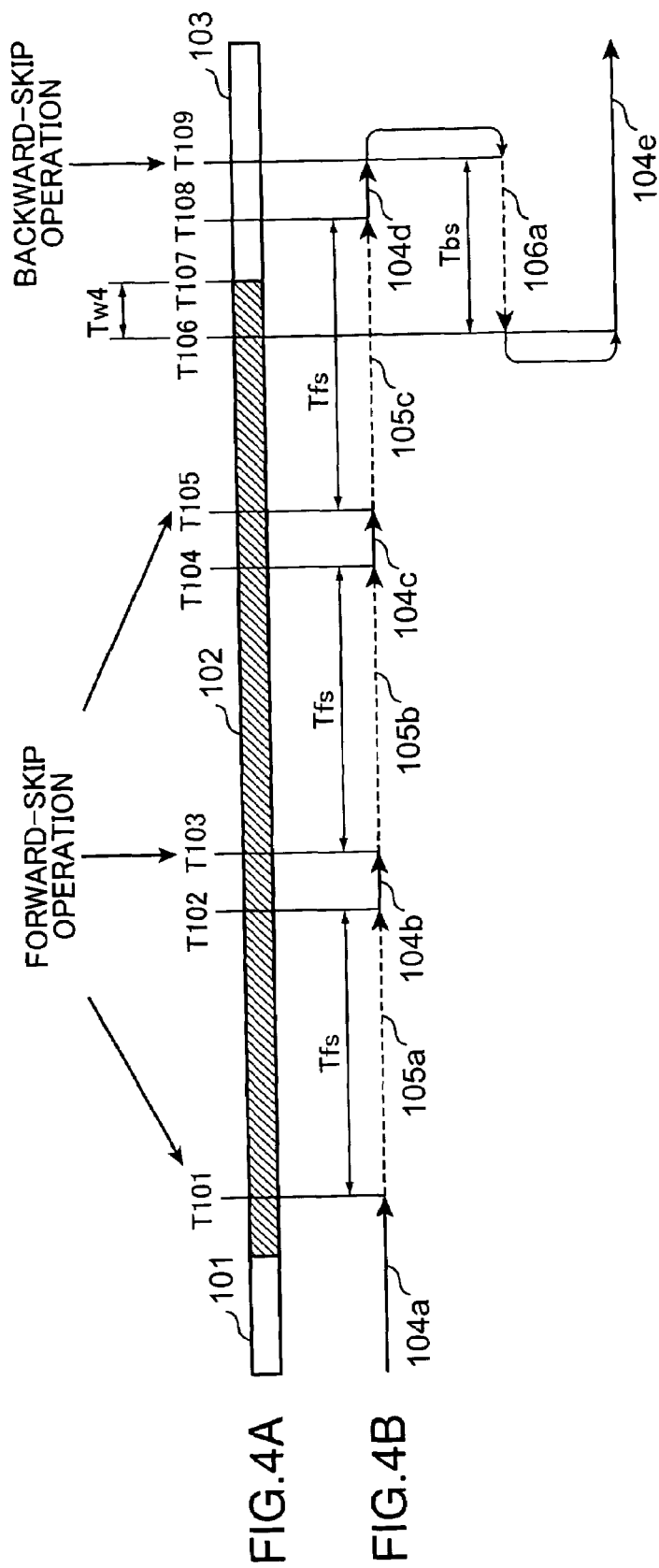

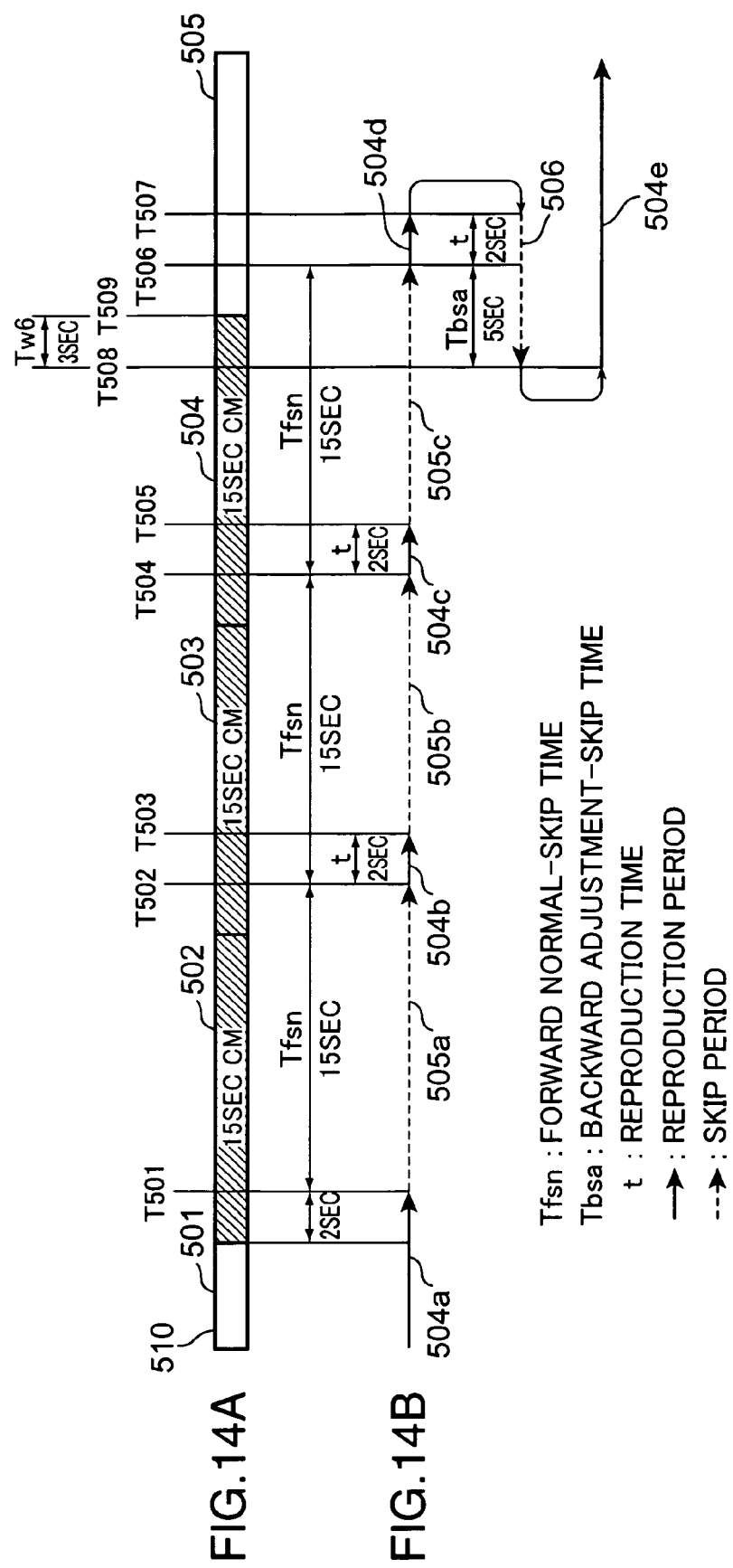

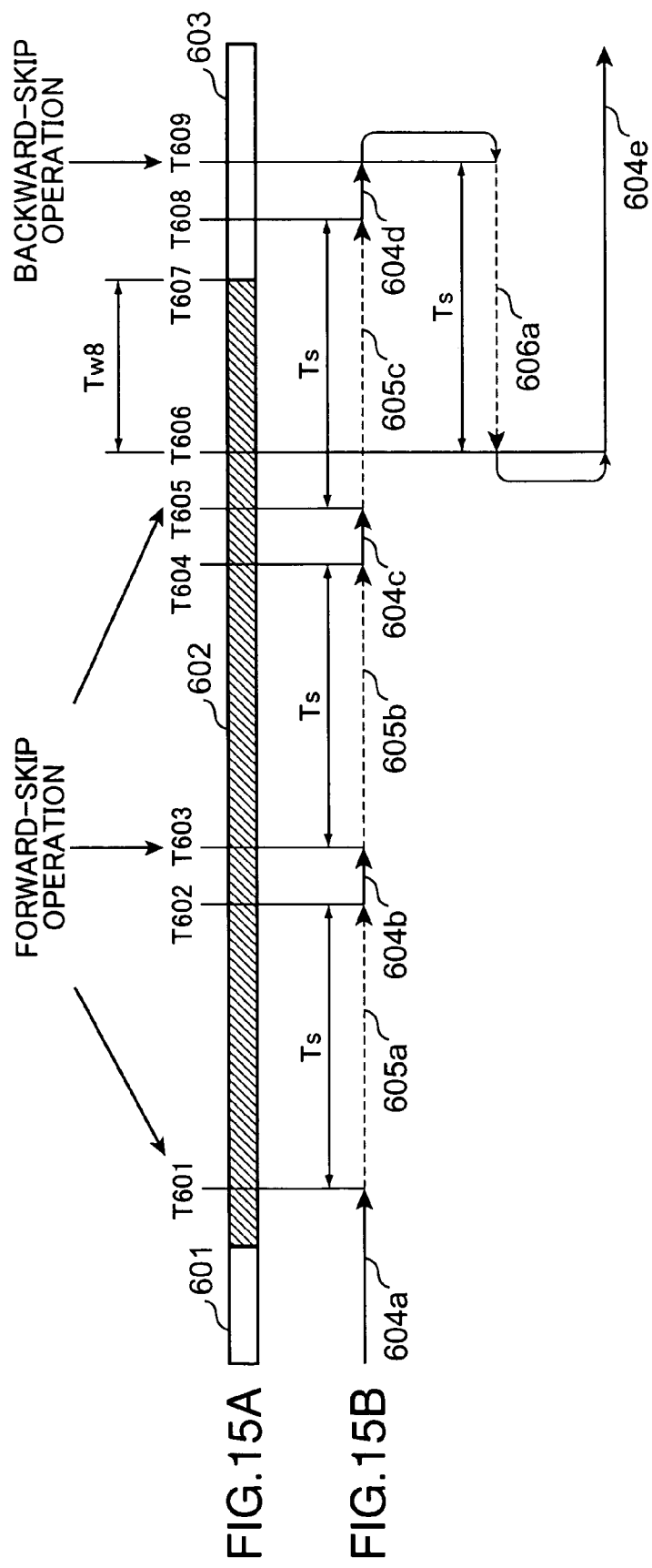

REPRODUCTION APPARATUS FOR SHORTENING A USER'S WAITING TIME UNTIL REPRODUCING A BEGINNING OF A PART THAT THE USER WANTS TO VIEW, AND A REPRODUCTION METHOD AND COMPUTER READABLE RECORDING MEDIUM HAVING A PROGRAM RECORDED THEREON FOR PERFORMING THE SAME

BACKGROUND OF THE INVENTION

1. Field of Invention

The present invention relates to a reproduction apparatus, a reproduction method, a reproduction program, and a computer-readable recording medium where a reproduction program is stored, which reproduce a picture or a voice recorded in a recording medium.

2. Description of the Related Art

Conventionally, a method is generally used in which a skip operation is executed when a picture or a voice recorded in a recording medium is reproduced. If you hope to omit the part you do not want to watch, or if you hope to jump to the part you want to view, then you can skip what you do not want to watch, or you can skip to what you want to view.

As this method of skipping the part you do not want to view or skipping to the part you want to view, there is a method where an operation switch is provided and this operation switch is pressed during a reproduction so that a preset time can be skipped forward or backward (e.g., refer to Patent Document 1).

Referring to FIGS. 15A and 15B, an operation will be specifically described about the conventional skip processing of Patent Document 1. FIGS. 15A and 15B illustrate the conventional skip-processing operation of Patent Document 1. FIG. 15A shows an array of pictures or voices which are recorded in a recording medium. FIG. 15B shows a reproduction and a skip. In FIG. 15A, white belts 601, 603 indicate the parts of the pictures or voices recorded in the recording medium which a user wants to watch or listen to. A hatched belt 602 indicates the part of the pictures or voices recorded in the recording medium which the user does not want to view or listen to.

In FIG. 15B, each solid-line rightward arrow 604a, 604b, 604c, 604d, 604e indicates a reproduction processing. Each broken-line rightward arrow 605a, 605b, 605c indicates a forward skip processing. A broken-line leftward arrow 606a indicates a backward skip processing.

In FIG. 15A which shows the array of pictures or voices recorded in the recording medium, as an example, by taking up the operation for skipping the part 602 which the user does not want to watch or listen to, the operation of a skip method will be described in the conventional reproduction apparatus.

When the pictures or voices recorded in the recording medium are reproduced as shown by the solid-line rightward arrow 604a of FIG. 15B, in the position shown by timing T601, the user notices that the part 602 the user does not want to view has come. In order to skip to the part which the user wants to watch or listen to, the user executes a forward-skip operation. Thereby, as shown by the broken-line rightward arrow 605a, a preset skip time Ts is skipped, and from the position shown by timing T602, the reproduction is resumed as shown by the solid-line rightward arrow 604b.

Next, in the position shown by timing T603, the user becomes aware that the reproduction is still in the part 602 the user does not want to view. In order to skip to the part which the user wants to watch, the user executes the forward-skip operation. Thereby, as shown by the broken-line rightward arrow 605b, a skip is executed over the preset skip time Ts, and from the position shown by timing T604, the reproduction is resumed as shown by the solid-line rightward arrow 604c.

Sequentially, in the position shown by timing T605, the user notices that the reproduction is still in the part 602 the user does not want to view. In order to skip to the part which the user wants to watch, the user executes the forward-skip operation. Thereby, as shown by the broken-line rightward arrow 605c, the reproduction skips over the preset skip time Ts, and from the position shown by timing T608, the reproduction is resumed as shown by the solid-line rightward arrow 604d.

Next, in the position shown by timing T609, the user becomes aware that the reproduction has skipped up to the part 603 which the user wants to watch. In order to watch the part 603 which the user wants to view from the beginning shown by timing T607, the user executes a backward-skip operation. Thereby, as shown by the broken-line leftward arrow 606a, the preset skip time Ts is skipped, and from the position shown by timing T606, the reproduction is resumed as shown by the solid-line rightward arrow 604e.

At this time, in the reproduction state, the user waits to reach the head of the part 603 the user wants to view (i.e., for a period Tw8 from the timing T606 to the timing T607). Then, the user watches the part 603 which the user wants to view. In this way, using the conventional skip processing of Patent Document 1, a skip can be executed over the part which the user does not want to view, or a skip can be executed up to the part which the user wants to view.

Patent Document 1: Japanese Patent Laid-Open No. 9-147534 specification.

BRIEF SUMMARY OF THE INVENTION

However, according to the conventional skip processing, in the forward-skip operation and the backward-skip operation, the skip time is the same, no matter whether it is forward or backward. Therefore, in order to skip the part which the user does not want to view, the user repeats the forward-skip operation. Thereafter, the user executes the backward-skip operation, so that the user can watch the part which the user wants to view, from the beginning. At this time, the time longer than necessary is skipped backward. This presents a disadvantage in that the user has to wait for a long time until the head of the part which the user wants to view is reproduced.

In order to evade this disadvantage, if the skip time is set shorter in such a skip operation, that can shorten the waiting time until the head of the part which the user wants to view is reproduced. However, if such a shorter skip time is set, another disadvantage arises in that more skips are required to skip the part which the user does not want to view.

In order to resolve the above described disadvantages, it is an object of the present invention to provide a reproduction apparatus, a reproduction method, a reproduction program, and a computer-readable recording medium where a reproduction program is stored, which are capable of shortening a user's waiting time until the beginning of the part which the user wants to view is reproduced and improving the user's operability.

A reproduction apparatus according to the present invention, characterized by including: a reproducing means for reading information stored in a recording medium and reproducing this information; a skip-operation accepting means for arbitrarily accepting either instruction for a forward reproduction-position skip or a backward reproduction-position skip; a skip-time determining means for making a skip time for either of the forward reproduction-position skip and the backward reproduction-position skip longer than a skip time for the other, and determining a skip time based on either of the instruction for the forward reproduction-position skip and the instruction for the backward reproduction-position skip which is accepted by the skip-operation accepting means; and a controlling means for, if the skip-operation accepting means accepts either instruction for the forward reproduction-position skip or the backward reproduction-position skip during a reproduction in the reproducing means, then stopping the reproduction in the reproducing means, moving the position in which the reproducing means reads information from the recording medium by the skip time determined by the skip-time determining means, and resuming the reproduction after the movement of the reading position is completed.

According to this configuration, information stored in a recording medium is read and this information is reproduced. Then, either instruction for a forward reproduction-position skip or a backward reproduction-position skip is arbitrarily accepted. Next, a skip time for either of the forward reproduction-position skip and the backward reproduction-position skip is made longer than a skip time for the other, and a skip time is determined based on either of the instruction for the forward reproduction-position skip and the instruction for the backward reproduction-position skip which has been accepted. During a reproduction, if either instruction for the forward reproduction-position skip or the backward reproduction-position skip is accepted, then the reproduction is brought to a stop, the position in which information is read from the recording medium is moved by the determined skip time, and the reproduction is resumed after the movement of the reading position has been completed.

In this way, the skip time is determined based on whether the accepted skip is forward or backward. Besides, the skip time for either of the forward reproduction-position skip and the backward reproduction-position skip is made longer than the skip time for the other.

According to the present invention, the forward skip time becomes longer than the backward skip time. In order to skip the part which a user does not want to view, the user repeatedly gives an instruction for the forward skip. Thereafter, the user executes the backward skip, so that the user can watch the part which the user wants to view, from its beginning. In this case, the skip time is determined so that the backward skip time becomes shorter than the forward skip time. This helps shorten the user's waiting time until the head of the part which the user wants to view is reproduced, and enhance the user's operability.

The objects, characteristics and advantages of the present invention will be more evident in the following detailed description and attached drawings.

BRIEF DESCRIPTION OF THE DRAWINGS

FIG. 3 is a flow chart, showing the processing contents of a controller of the DVD player according to the first embodiment of the present invention.

FIGS. 4A and 4B illustrate an operation of the DVD player according to the first embodiment of the present invention.

FIGS. 14A and 14B illustrate a concrete operation of the DVD player according to the fourth embodiment of the present invention.

FIGS. 15A and 15B a skip-processing operation by a conventional reproduction apparatus.

DETAILED DESCRIPTION OF THE INVENTION

Hereinafter, the reproduction apparatus according to each embodiment of the present invention will be described with reference to the attached drawings.

First Embodiment

Figure 1:
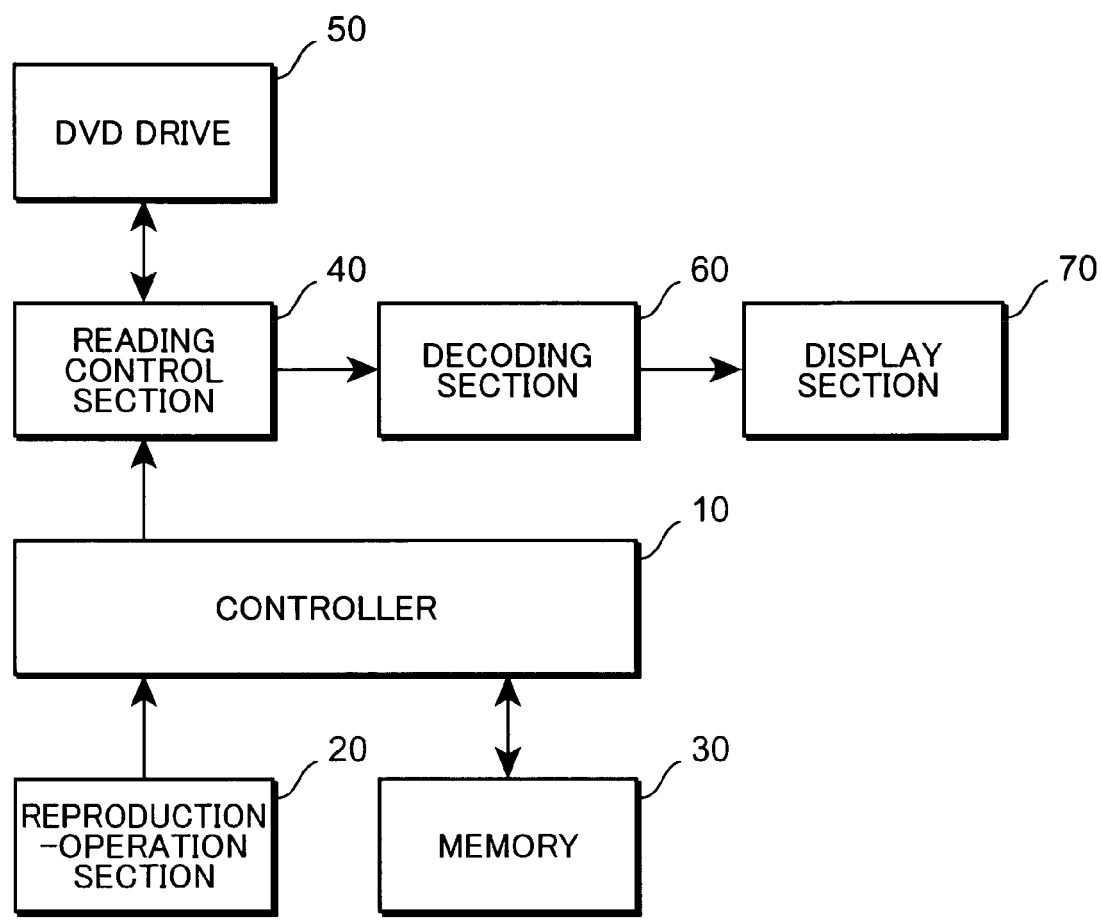
FIG. 1 is a block diagram, showing an example of the configuration of a DVD player according to a first embodiment of the present invention.

FIG. 1 is a block diagram, showing an example of the configuration of a DVD player according to a first embodiment of the present invention. Its reproduction-processing operation will be described below.

The DVD player shown in FIG. 1 is an example of the reproduction apparatus. It is configured by: a controller 10; a reproduction-operation section 20; a memory 30; a reading control section 40; a DVD drive 50; a decoding section 60; and a display section 70.

The controller 10 executes control so that information (e.g., a picture and a voice) recorded in a DVD disk is reproduced. It executes control, using the memory 30, so that the information recorded in the DVD disk can be reproduced. The controller 10 controls the reading control section 40 according to instructions from the reproduction-operation section 20. According to the control of the controller 10, the reading control section 40 reads a stream from the DVD drive 50. Then, it outputs, to the decoding section 60, the stream which it has read from the DVD drive 50. The decoding section 60 decodes the stream inputted from the reading control section 40 and outputs the information it has decoded to the display section 70. The display section 70 displays the decoded information inputted from the decoding section 60.

Figure 2:
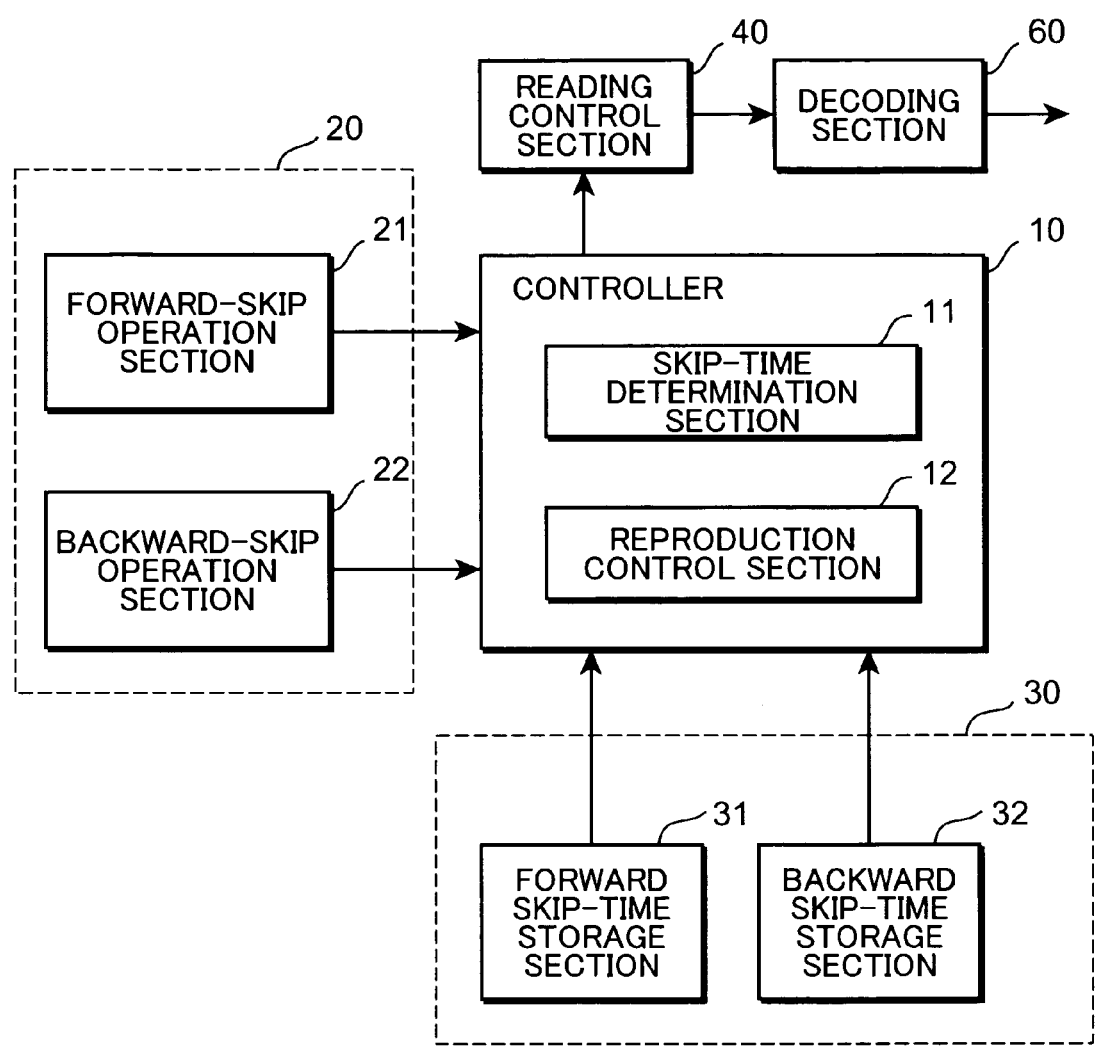
FIG. 2 is a block diagram, showing a detailed configuration of the DVD player according to the first embodiment of the present invention.

FIG. 2 is a block diagram, showing a detailed configuration of the DVD player shown in FIG. 1. The reproduction-operation section 20 includes a forward-skip operation section 21 and a backward-skip operation section 22. The forward-skip operation section 21 accepts an instruction for a forward reproduction-position skip by a user. The backward-skip operation section 22 accepts an instruction for a backward reproduction-position skip by a user. The memory 30 includes a forward skip-time storage section 31 and a backward skip-time storage section 32. In the forward skip-time storage section 31, a forward skip time Tfs at the time of a forward skip is stored beforehand. In the backward skip-time storage section 32, a backward skip time Tbs at the time of a backward skip is stored beforehand. The backward skip time Tbs is a smaller value than the forward skip time Tfs.

The controller 10 includes a skip-time determination section 11 and a reproduction control section 12. The skip-time determination section 11 determines a skip time, based on either of the instruction for a forward reproduction-position skip which is accepted by the forward-skip operation section 21 and the instruction for a backward reproduction-position skip which is accepted by the backward-skip operation section 22.

While the reading control section 40 is executing a reproduction, if either of the instruction for a forward reproduction-position skip by the forward-skip operation section 21 and the instruction for a backward reproduction-position skip by the backward-skip operation section 22 is accepted, then the reproduction control section 12 stops the reproduction by the reading control section 40. Next, it moves the position in which the reading control section 40 reads information from the recording medium, by the skip time determined by the skip-time determination section 11. Then, it resumes the reproduction after the movement of the reading position has been completed.

Herein, in this embodiment: the reading control section 40 corresponds to an example of the reproducing means; the forward-skip operation section 21 and the backward-skip operation section 22 correspond to an example of the skip-operation accepting means; the skip-time determination section 11 corresponds to an example of the skip-time determining means; the reproduction control section 12 corresponds to an example of the controlling means; the forward skip-time storage section 31 corresponds to an example of the forward skip-time storing means; and the backward skip-time storage section 32 corresponds to an example of the backward skip-time storing means.

Hereinafter, in the first embodiment, an operation will be described in the case where the forward-skip operation section 21 or the backward-skip operation section 22 is operated during a reproduction.

If an instruction is given from the forward-skip operation section 21, the skip-time determination section 11 extracts the forward skip time Tfs from the forward skip-time storage section 31. Then, the reproduction control section 12 instructs the reading control section 40 to move the reading position forward by the forward skip time Tfs extracted from the forward skip-time storage section 31.

On the other hand, if an instruction is given from the backward-skip operation section 22, the skip-time determination section 11 extracts the backward skip time Tbs from the backward skip-time storage section 32. Then, the reproduction control section 12 instructs the reading control section 40 to move the reading position backward by the backward skip time Tbs extracted from the backward skip-time storage section 32.

FIG. 3 is a flow chart, showing the processing contents of the controller 10 of the DVD player according to the first embodiment shown in FIG. 1 and FIG. 2. It is made up of the processing from a step S1 to a step S11. In the case where the forward-skip operation section 21 or the backward-skip operation section 22 is operated during a reproduction, the operation state and processing contents will be described below.

First, in a step S1, the reproduction control section 12 decides whether or not an instruction is given for a reproduction operation for reproducing information stored in a DVD disk which is the recording medium. The reproduction-operation section 20 accepts the reproduction operation by a user. If it has accepted the reproduction operation, it outputs the reproduction instruction to the reproduction control section 12. Herein, if the decision is made that no instruction is given for the reproduction operation (NO in the step S1), it is kept on standby until an instruction is given for the reproduction operation.

On the other hand, if the decision is made that an instruction has been given for the reproduction operation (YES in the step S1), the reproduction instruction is inputted from the reproduction-operation section 20 in a step S2. Then, the reproduction control section 12 instructs the reading control section 40 to read information from a reproduction position which is designated by the user. The reading control section 40 calculates the reading position of the DVD disk which corresponds to the information reproduction position designated by the user. Then, it controls the DVD drive 50 so that it reads information from this reading position. The DVD drive 50 drives its internal actuator so that an optical pickup moves to the reading position. Then, it reads a stream which is stored in the DVD disk and outputs it to the reading control section 40. The reading control section 40 outputs the stream outputted from the DVD drive 50 to the decoding section 60. The decoding section 60 decodes the stream outputted from the reading control section 40 and outputs the information it has decoded to the display section 70. The display section 70 displays the information decoded by the decoding section 60.

Next, in a step S3, the reproduction control section 12 decides whether there is a skip operation or not. The forward-skip operation section 21 accepts a forward reproduction-position skip operation by the user. If it has accepted a forward skip operation, it outputs a forward skip instruction to the reproduction control section 12. In contrast, the backward-skip operation section 22 accepts a backward reproduction-position skip operation by the user. If it has accepted a backward skip operation, it outputs a backward skip instruction to the reproduction control section 12. Incidentally, the processing of the step S3 is frequently executed while being reproduced.

If the decision is made that no instruction has been given for the forward and the backward skip operations (NO in the step S3), then in a step S4, the reproduction control section 12 decides whether or not an instruction is given for a stop operation for stopping the information which is currently reproduced. The reproduction-operation section 20 accepts the stop operation by the user. If it has accepted the stop operation, it outputs a stop instruction to the reproduction control section 12. Herein, if the decision is made that no instruction has been given for the stop operation (NO in the step S4), the processing returns to the step S2. Then, the information read from the DVD disk is continuously reproduced.

On the other hand, if the decision is made that an instruction has been given for the stop operation (YES in the step S4), then in a step S5, the reproduction control section 12 instructs the reading control section 40 to stop reading information. If the stop instruction is inputted from the reproduction control section 12 in the reading control section 40, the reading control section 40 controls the DVD drive 50 so that it stops reading information.

If the decision is made that an instruction has been given for the forward or the backward skip operation (YES in the step S3), then in a step S6, the reproduction control section 12 instructs the reading control section 40 to stop reading information. If the stop instruction is inputted from the reproduction control section 12 in the reading control section 40, the reading control section 40 controls the DVD drive 50 so that it stops reading information.

Next, in a step S7, the reproduction control section 12 decides whether or not the forward skip operation has been accepted. If the decision is made that the forward skip operation has been accepted (YES in the step S7), then in a step S8, the skip-time determination section 11 determines a forward reproduction-position skip time. Specifically, the skip-time determination section 11 reads the forward skip time Tfs stored beforehand in the forward skip-time storage section 31. In this embodiment, the forward skip time Tfs is set, for example, at 15 seconds.

Sequentially, in a step S9, the reproduction control section 12 instructs the reading control section 40 to move the reading position forward by the forward skip time Tfs read from the forward skip-time storage section 31. The reading control section 40 calculates the reading position which corresponds to the reproduction position which is the forward skip time Tfs ahead of the current reproduction position. Then, it instructs the DVD drive 50 to move the optical pickup to the reading position it has calculated. The DVD drive 50 drives the actuator and moves the optical pickup's reading position by the forward skip time Tfs from the current reading position. Then, after the movement of the reading position has been completed, the processing returns to the step S2 and the reproduction is resumed.

On the other hand, if the decision is made that the forward skip operation has not been accepted, in other words, that the backward skip operation has been accepted (NO in the step S7), then in a step S10, the skip-time determination section 11 determines a backward reproduction-position skip time. Specifically, the skip-time determination section 11 reads the backward skip time Tbs stored beforehand in the backward skip-time storage section 32. In this embodiment, the backward skip time Tbs is set, for example, at five seconds.

Next, in a step S11, the reproduction control section 12 instructs the reading control section 40 to move the reading position backward by the backward skip time Tbs read from the backward skip-time storage section 32. The reading control section 40 calculates the reading position which corresponds to the reproduction position which is the backward skip time Tbs behind the present reproduction position. Then, it instructs the DVD drive 50 to move the optical pickup to the reading position it has calculated. The DVD drive 50 drives the actuator and moves the optical pickup's reading position by the backward skip time Tbs from the present reading position. Then, after the movement of the reading position has been completed, the processing returns to the step S2 and the reproduction is resumed.

In this way, the skip time is determined based on whether the accepted skip is forward or backward. Besides, the skip time for either of the forward reproduction-position skip and the backward reproduction-position skip is made longer than the skip time for the other. Therefore, the forward skip time becomes longer than the backward skip time. In order to skip the part which a user does not want to view, the user repeatedly gives an instruction for the forward skip. Thereafter, the user executes the backward skip, so that the user can watch the part which the user wants to view, from its beginning. In this case, the skip time is determined so that the backward skip time becomes shorter than the forward skip time. This helps shorten the user's waiting time until the beginning of the part which the user wants to view is reproduced, and enhance the user's operability.

Furthermore, the forward reproduction-position skip time is stored in advance and the backward reproduction-position skip time is stored beforehand. Then, if a forward skip instruction is accepted, the forward reproduction-position skip time stored in advance is chosen. In contrast, if a backward reproduction-position skip instruction is accepted, the backward reproduction-position skip time stored beforehand is chosen. In sum, the skip time which is stored in advance is chosen. Therefore, the skip time which corresponds to the forward or backward reproduction-position skip operation can be easily determined.

Moreover, the value of the forward reproduction-position skip time is greater than that of the backward reproduction-position skip time, and they are stored beforehand. In order to skip the part which a user does not want to view, the user repeatedly gives an instruction for the forward skip. Thereafter, the user executes the backward skip, so that the user can watch the part which the user wants to view, from its beginning. In this case, the skip time is determined so that the backward skip time becomes shorter than the forward skip time. This helps shorten the user's waiting time until the beginning of the part which the user wants to view is reproduced.

FIGS. 4A and 4B illustrate an operation of the DVD player according to the first embodiment of the present invention. Specifically, FIG. 4A shows an array of pictures or voices recorded in a DVD disk which is set in the DVD drive 50. FIG. 4B shows a reproduction and a skip. In FIG. 4A, white belts 101, 103 indicate the parts of the pictures or voices recorded in the DVD disk which a user wants to watch or listen to. A hatched belt 102 indicates the part of the pictures or voices recorded in the DVD disk which the user does not want to view.

In addition, in FIG. 4B, each solid-line rightward arrow 104a, 104b, 104c, 104d, 104e indicates a reproduction processing. Each broken-line rightward arrow 105a, 105b, 105c indicates a forward skip processing. A broken-line leftward arrow 106a indicates a backward skip processing. In the pictures or voices recorded in the DVD disk, as an example, by taking up the operation for skipping the part 102 which the user does not want to watch, an operation will be described about the DVD player according to the first embodiment of the present invention.

When the pictures or voices recorded in the DVD disk are reproduced as shown by the solid-line rightward arrow 104a, in the position shown by timing T101, the user notices that the part 102 the user does not want to view has come. In order to skip to the part which the user wants to watch, the user operates the forward-skip operation section 21. Thereby, as shown by the broken-line rightward arrow 105a, a skip is executed over the forward skip time Tfs stored in the forward skip-time storage section 31, and from the position shown by timing T102, the reproduction is resumed as shown by the solid-line rightward arrow 104b.

Next, in the position shown by timing T103, the user becomes aware that the reproduction is still in the part 102 the user does not want to view. In order to skip to the part which the user wants to watch, the user further operates the forward-skip operation section 21. Thereby, as shown by the broken-line rightward arrow 105b, a skip is executed over the forward skip time Tfs stored in the forward skip-time storage section 31, and from the position shown by timing T104, the reproduction is resumed as shown by the solid-line rightward arrow 104c.

Sequentially, in the position shown by timing T105, the user notices that the reproduction is still in the part 102 the user does not want to view. In order to skip to the part which the user wants to watch, the user the user still further operates the forward-skip operation section 21. Thereby, as shown by the broken-line rightward arrow 105c, the reproduction skips over the forward skip time Tfs stored in the forward skip-time storage section 31, and from the position shown by timing T108, the reproduction is resumed as shown by the solid-line rightward arrow 104d.

Next, in the position shown by timing T109, the user becomes aware that the reproduction has skipped up to the part 103 which the user wants to watch. In order to watch the part 103 which the user wants to view from the beginning shown by timing T107, the user operates the backward-skip operation section 22. Thereby, as shown by the broken-line leftward arrow 106a, a skip is executed over the backward skip time Tbs stored in the backward skip-time storage section 32. Then, from the position shown by timing T106, the reproduction is resumed as shown by the solid-line rightward arrow 104e. In the reproduction state, the user waits for the reproduction to come to an end for a period Tw4 from the timing T106 to the head of the part 103 the user wants to view which is indicated by the timing T107. Then, the user watches the part 103 which the user wants to view.

Figures 5A, 5B:
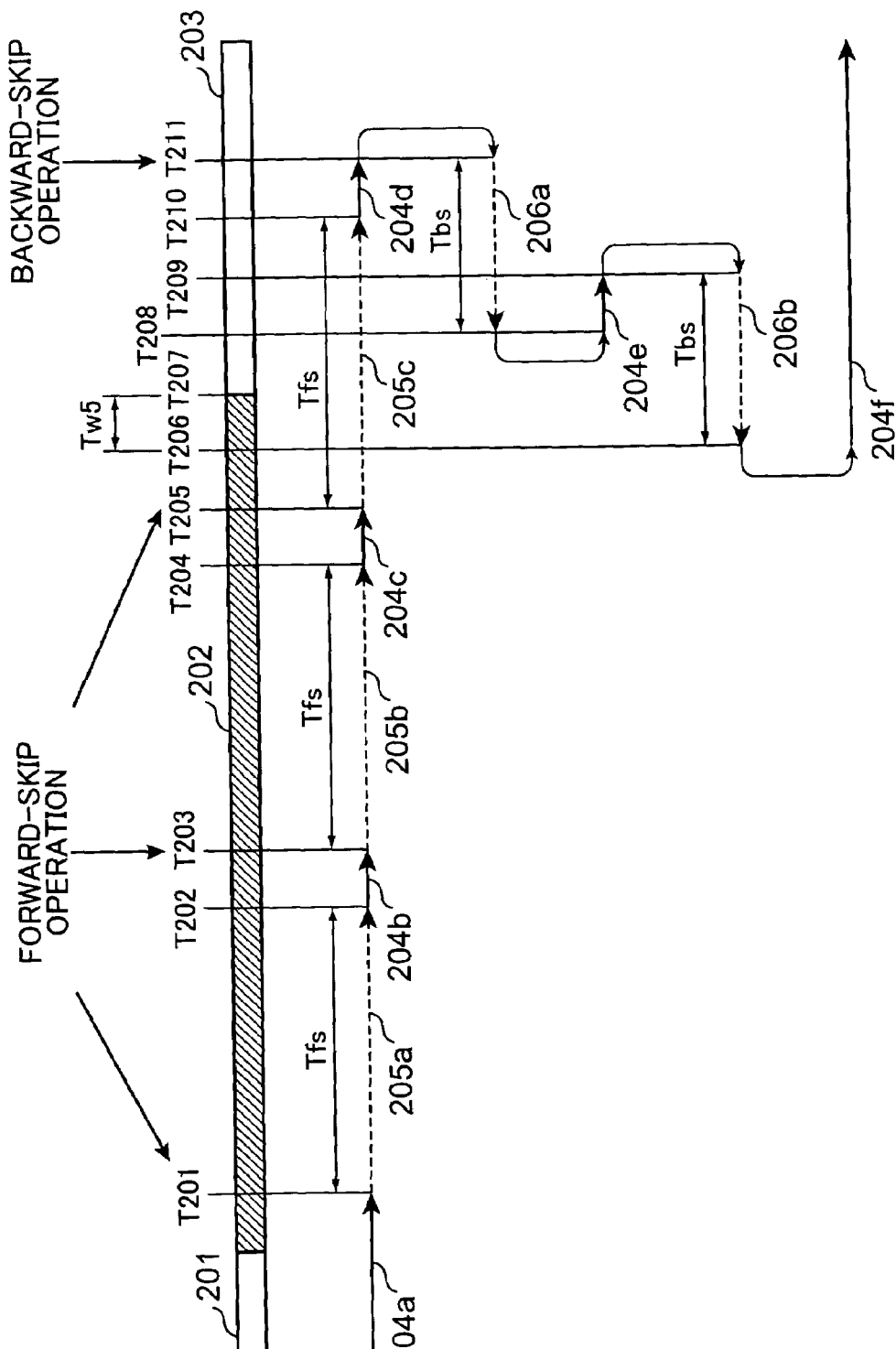
FIGS. 5A and 5B illustrate an operation of the DVD player according to the first embodiment of the present invention, in the case where the part which a user does not want to view is slightly shorter than that of FIG. 4.

FIGS. 5A and 5B illustrate an operation of the DVD player according to the first embodiment of the present invention, in the case where the part which a user does not want to view is slightly shorter than that of FIGS. 4A and 4B. FIG. 5A shows an array of pictures or voices recorded in a DVD disk which is set in the DVD drive 50. FIG. 5B shows a reproduction and a skip. In FIG. 5A, white belts 201, 203 indicate the parts of the pictures or voices recorded in the DVD disk which a user wants to watch or listen to. A hatched belt 202 indicates the part of the pictures or voices recorded in the DVD disk which the user does not want to view.

In addition, in FIG. 5B, each solid-line rightward arrow 204a, 204b, 204c, 204d, 204e, 204f indicates a reproduction processing. Each broken-line rightward arrow 205a, 205b, 205c indicates a forward skip processing. Each broken-line leftward arrow 206a, 206b indicates a backward skip processing. In the pictures or voices recorded in the DVD disk, as an example, by taking up the operation for skipping the part 202 which the user does not want to watch, an operation will be described about the DVD player according to the first embodiment of the present invention.

Incidentally, in FIGS. 5A and 5B, from the position shown by timing T204 after the initial two forward-skip operations, the reproduction is resumed as shown by the solid-line rightward arrow 204c. Until this point of time, the operation is the same as that of FIGS. 4A and 4B, and thus, its description is omitted. Hence, a description will be given about the following operation.

Next, in the position shown by timing T205, the user becomes aware that the reproduction is still in the part 202 the user does not want to view. In order to skip to the part which the user wants to watch, the user operates the forward-skip operation section 21. Thereby, as shown by the broken-line rightward arrow 205c, a skip is executed over the forward skip time Tfs stored in the forward skip-time storage section 31, and from the position shown by timing T210, the reproduction is resumed as shown by the solid-line rightward arrow 204d.

Next, in the position shown by timing T211, the user becomes aware that the reproduction has skipped up to the part 203 which the user wants to watch. In order to watch the part 203 the user wants to view from the beginning which is indicated by timing T207, the user operates the backward-skip operation section 22. Thereby, as shown by the broken-line leftward arrow 206a, a skip is executed over the backward skip time Tbs stored in the backward skip-time storage section 32. Then, from the position shown by timing T208, the reproduction is resumed as shown by the solid-line rightward arrow 204e.

Sequentially, in the position shown by timing T209, the user becomes aware that the reproduction has not returned to the head of the part 203 which the user wants to watch. In order to watch the part 203 the user wants to view from the beginning which is indicated by timing T207, the user further operates the backward-skip operation section 22. Thereby, as shown by the broken-line leftward arrow 206b, a skip is executed over the backward skip time Tbs stored in the backward skip-time storage section 32. Then, from the position shown by timing T206, the reproduction is resumed as shown by the solid-line rightward arrow 204f. In the reproduction state, the user waits for the reproduction to come to an end for a period Tw5 from the timing T206 to the beginning of the part 203 the user wants to view which is indicated by the timing T207. Then, the user watches the part 203 which the user wants to view.

As described above, in this embodiment, a user executes a forward skip over the part which the user does not want to view. Thereafter, in order to watch the part which the user wants to view from its beginning, the user gives an instruction for a backward skip. Since the backward skip time Tbs is a smaller value than the forward skip time Tfs, the reproduction skips backward over the shorter skip time than the forward skip time. This helps shorten the user's waiting time until the head of the part which the user wants to view is reproduced.

Incidentally, the above described description is given, as an example, in the case where the present invention is applied to a DVD player. However, the present invention can be implemented, in the same way, even in a system which is capable of reading information from a recording medium other than a DVD disk and displaying it. For example, except for a DVD disk in which digital information can be optically read, it can be applied to a CD, an MD, an SD memory card, or the like. Furthermore, it can also be applied to a magnetic tape where analog information can be read.

Moreover, the reproduction-operation section 20 not necessarily has to be formed by the forward-skip operation section 21 and the backward-skip operation section 22. According to an operation method, a forward skip may also be distinguished from a backward skip. For example, the reproduction-operation section 20 may also be configured so that if a lever is brought down on the right side, that is judged to be a forward skip, while if the lever is pushed down on the left side, that is judged a backward skip.

In addition, the forward skip time Tfs and the backward skip time Tbs not necessarily need to be fixed values. They may also be variable values so that a user can set them. Furthermore, in this embodiment, the backward skip time Tbs is set to be a smaller value than the forward skip time Tfs. However, the present invention is not limited especially to this. The forward skip time Tfs may also be set to be a smaller value than the backward skip time Tbs.

In this case, the backward reproduction-position skip time Tbs is stored in advance which is a greater value than the forward reproduction-position skip time Tfs. Therefore, in order to skip the part which a user does not want to view, the user repeatedly gives an instruction for the backward skip. Thereafter, the user executes the forward skip, so that the user can watch the part which the user wants to view, from its beginning. In this case, the skip time is determined so that the forward skip time Tfs becomes shorter than the backward skip time Tbs. Hence, even if an instruction for the forward skip is given after the backward skip has been repeated, the part which the user wants to view can be prevented from being reproduced after passing its beginning. Therefore, the user can easily pinpoint the head of the part which the user wants to view.

Still further, in this embodiment, during a reproduction, if either instruction for the forward reproduction-position skip or the backward reproduction-position skip is accepted, then the reproduction is brought to a stop, the position in which information is read from the recording medium (i.e., DVD disk) is moved by the skip time determined by the skip-time determination section 11, and the reproduction is resumed after the movement of the reading position has been completed. However, the present invention is not limited especially to this. In this embodiment, if either instruction for the forward reproduction-position skip or the backward reproduction-position skip is accepted at a temporary stop, then the position in which information is read from the recording medium (i.e., DVD disk) may also be moved by the skip time determined by the skip-time determination section 11. In that case, only the initial information is reproduced in the moved reading position.

In this way, if either instruction for the forward reproduction-position skip or the backward reproduction-position skip is accepted at a temporary stop, then the position in which information is read from the recording medium is moved by the determined skip time. Then, only the initial information is reproduced in the moved reading position. Therefore, a user can confirm a picture which is displayed at a temporary stop and skip the reproduction position simultaneously. Hence, there is no need for the reproduction time which is taken to confirm the reproduction position after the skip operation.

Moreover, in this embodiment, the forward skip time Tfs is set, for example, at 15 seconds and the backward skip time Tbs is set, for example, at five seconds. However, the present invention is not limited especially to this. Taking into account an operation delay time which is taken to confirm whether or not the part which a user wants to view has come, the forward skip time Tfs may also be set, for example, at 14 seconds and the backward skip time Tbs may also be set, for example, at six seconds.

Incidentally, the component elements according to this embodiment may also be realized by operating a program in a computer. Such a program may also be recorded in a recording medium.

Second Embodiment

Next, a second embodiment of the present invention will be described. In the first embodiment, the backward skip time Tbs is set at a smaller value than the forward skip time Tfs. In contrast, in the second embodiment, a skip time is supposed to be chosen according to the contents of an operation ahead of a skip operation accepted by the forward-skip operation section 21 or the backward-skip operation section 22.

Figure 6:
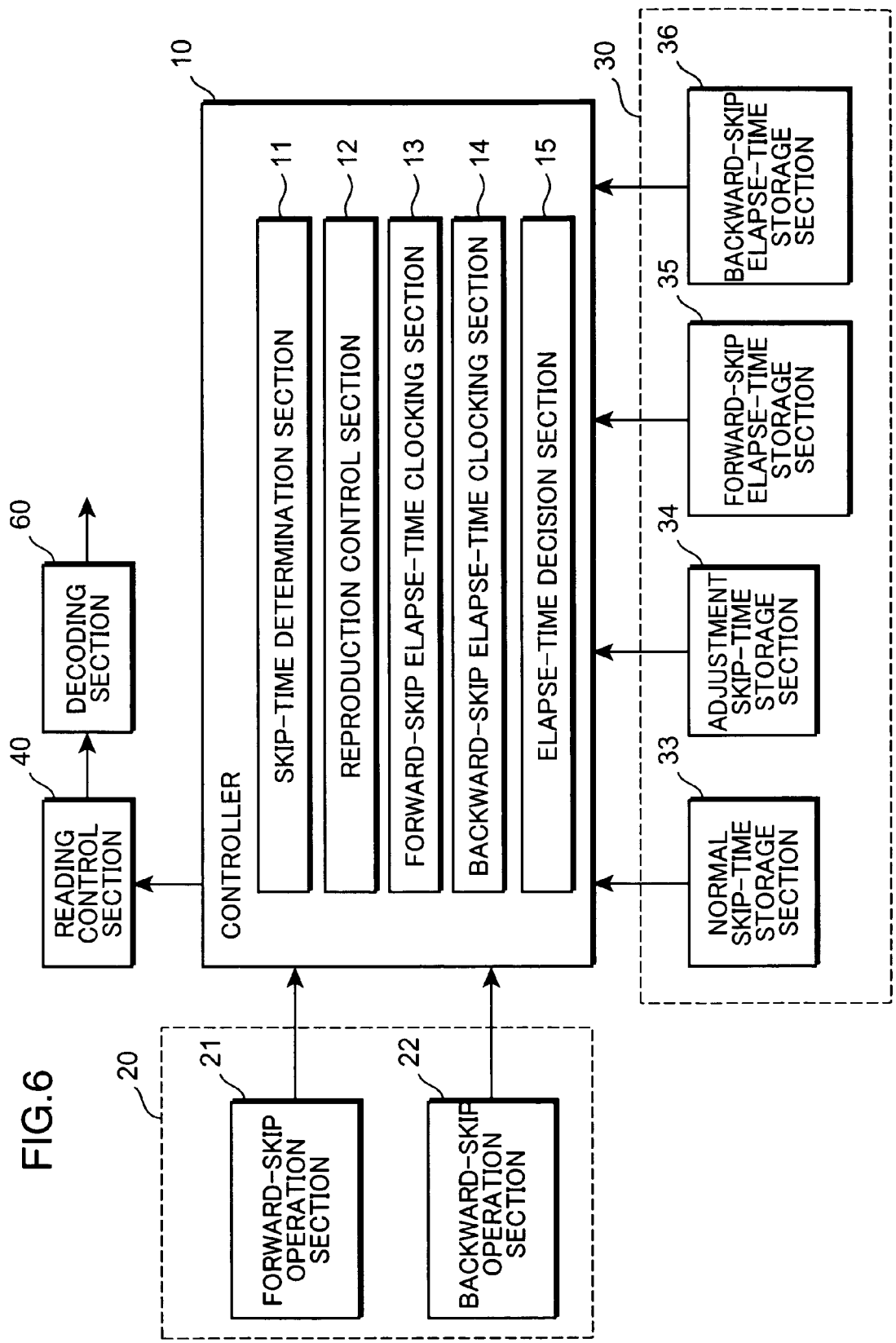
FIG. 6 is a block diagram, showing a detailed configuration of a DVD player according to a second embodiment of the present invention.

FIG. 6 is a block diagram, showing a detailed configuration of a DVD player according to the second embodiment of the present invention. The other component elements not shown in FIG. 6 are the same as those of the first embodiment. In FIG. 6, the component elements are given the same reference numerals as those of the first embodiment, as long as the former are identical to the latter. Thus, their description is omitted. A memory 30 includes: a normal skip-time storage section 33; an adjustment skip-time storage section 34; a forward-skip elapse-time storage section 35; and a backward-skip elapse-time storage section 36.

In the normal skip-time storage section 33, a normal skip time Tns is stored over which a skip is executed when the forward-skip operation section 21 or the backward-skip operation section 22 is operated, if a predetermine time has passed since the preceding skip operation in the opposite direction to this operation was executed. On the other hand, in the adjustment skip-time storage section 34, an adjustment skip time Tas is stored over which a skip is executed when the forward-skip operation section 21 or the backward-skip operation section 22 is operated, unless the predetermine time has passed since the preceding skip operation in the opposite direction to this operation was executed. The adjustment skip time Tas is a smaller value than the normal skip time Tns.

In the forward-skip elapse-time storage section 35, a forward-skip elapse time is stored which is the time which has elapsed since the forward-skip operation section 21 was last operated. In contrast, the backward-skip elapse-time storage section 36, a backward-skip elapse time is stored which is the time which has elapsed since the backward-skip operation section 22 was last operated. The forward-skip elapse time and the backward-skip elapse time are automatically updated as time passes by a forward-skip elapse-time clocking section 13 and a backward-skip elapse-time clocking section 14, respectively.

A controller 10 includes: a skip-time determination section 11; a reproduction control section 12; the forward-skip elapse-time clocking section 13; the backward-skip elapse-time clocking section 14; and an elapse-time decision section 15.

The forward-skip elapse-time clocking section 13 clocks the time which has elapsed since the forward-skip operation section 21 gave the last instruction for the forward reproduction-position skip. Using this elapse time, it updates the forward-skip elapse time stored in the forward-skip elapse-time storage section 35.

The backward-skip elapse-time clocking section 14 clocks the time which has elapsed since the backward-skip operation section 22 gave the last instruction for the backward reproduction-position skip. Using this elapse time, it updates the backward-skip elapse time stored in the backward-skip elapse-time storage section 36.

If the forward-skip operation section 21 has accepted the forward reproduction-position skip instruction, the elapse-time decision section 15 decides whether or not the elapse time clocked by the backward-skip elapse-time clocking section 14 has exceeded a predetermined time. On the other hand, if the backward-skip operation section 22 has accepted the backward reproduction-position skip instruction, it decides whether or not the elapse time clocked by the forward-skip elapse-time clocking section 13 has exceeded a predetermined time. Herein, such a predetermined time is stored beforehand in a given area inside of the memory 30.

If the elapse-time decision section 15 decides that the predetermined time has passed, the skip-time determination section 11 determines the normal skip time Tns as the skip time. On the other hand, if the elapse-time decision section 15 decides that the predetermined time has not passed, it determines, as the skip time, the adjustment skip time Tas which is shorter than the normal skip time Tns.

Herein, in this embodiment: the forward-skip elapse-time clocking section 13 corresponds to an example of the forward skip-operation elapse-time clocking means; the backward-skip elapse-time clocking section 14 corresponds to an example of the backward skip-operation elapse-time clocking means; the elapse-time decision section 15 corresponds to an example of the backward-skip deciding means, the forward-skip deciding means and the deciding means; the normal skip-time storage section 33 corresponds to an example of the first skip-time storing means; and the adjustment skip-time storage section 34 corresponds to an example of the second skip-time storing means.

Hereinafter, in the second embodiment, an operation will be described in the case where the forward-skip operation section 21 or the backward-skip operation section 22 is operated during a reproduction.

If an instruction is given from the forward-skip operation section 21, the elapse-time decision section 15 extracts the backward-skip elapse time from the backward-skip elapse-time storage section 36. Then, it decides whether or not the predetermined time or more has elapsed. If the predetermined time or more has elapsed, the skip-time determination section 11 extracts the normal skip time Tns from the normal skip-time storage section 33. Then, the reproduction control section 12 instructs the reading control section 40 to move the reading position forward by the normal skip time Tns.

On the other hand, unless the predetermined time or more has elapsed, the skip-time determination section 11 extracts the adjustment skip time Tas from the adjustment skip-time storage section 34. Then, the reproduction control section 12 instructs the reading control section 40 to move the reading position forward by the adjustment skip time Tas.

In addition, if an instruction is given from the backward-skip operation section 22, the elapse-time decision section 15 extracts the forward-skip elapse time from the forward-skip elapse-time storage section 35. Then, it decides whether or not the predetermined time or more has elapsed. If the predetermined time or more has elapsed, the skip-time determination section 11 extracts the normal skip time Tns from the normal skip-time storage section 33. Then, the reproduction control section 12 instructs the reading control section 40 to move the reading position backward by the normal skip time Tns.

On the other hand, unless the predetermined time or more has elapsed, the skip-time determination section 11 extracts the adjustment skip time Tas from the adjustment skip-time storage section 34. Then, the reproduction control section 12 instructs the reading control section 40 to move the reading position forward by the adjustment skip time Tas.

Figure 7:
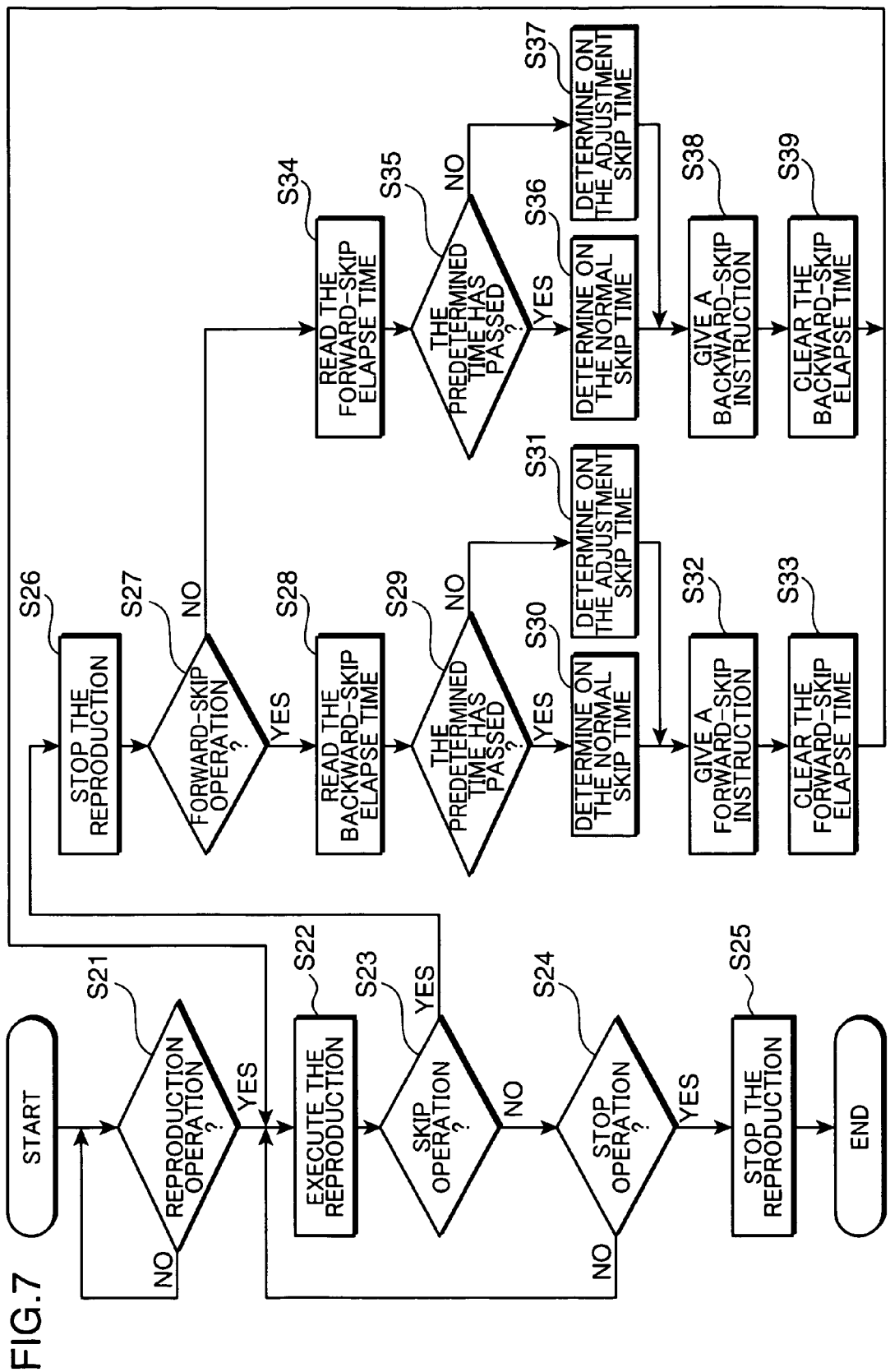
FIG. 7 is a flow chart, showing the processing contents of a controller of the DVD player according to the second embodiment shown in FIG. 6.

FIG. 7 is a flow chart, showing the processing contents of the controller 10 of the DVD player according to the second embodiment shown in FIG. 6. It is made up of the processing from a step S21 to a step S39. In the case where the forward-skip operation section 21 or the backward-skip operation section 22 is operated during a reproduction, the operation state and processing contents will be described below. Herein, the processing from a step S21 to a step S26 shown in FIG. 7 is the same as the processing from the step S1 to the step S6 shown in FIG. 3. Thus, their description is omitted.

In a step S27, the reproduction control section 12 decides whether or not a forward skip operation has been accepted. If the decision is made that the forward skip operation has been accepted (YES in the step S27), then in a step S28, the elapse-time decision section 15 reads the backward-skip elapse time stored in the backward-skip elapse-time storage section 36.

Next, in a step S29, the elapse-time decision section 15 decides whether or not the backward-skip elapse time read from the backward-skip elapse-time storage section 36 has exceeded a predetermined time.

If the decision is made that the backward-skip elapse time has exceeded the predetermined time (YES in the step S29), then in a step S30, the skip-time determination section 11 reads the normal skip time Tns stored beforehand in the normal skip-time storage section 33. Then, it determines the normal skip time Tns as the forward reproduction-position skip time. In this embodiment, the normal skip time Tns is set, for example, at 15 seconds.

On the other hand, if the decision is made that the backward-skip elapse time has not exceeded the predetermined time (NO in the step S29), then in a step S31, the skip-time determination section 11 reads the adjustment skip time Tas stored beforehand in the adjustment skip-time storage section 34. Then, it determines the adjustment skip time Tas as the forward reproduction-position skip time. In this embodiment, the adjustment skip time Tas is set, for example, at five seconds.

If the normal skip time Tns is determined to be the forward reproduction-position skip time, in a step S32, the reproduction control section 12 instructs the reading control section 40 to move the reading position forward by the normal skip time Tns read from the normal skip-time storage section 33. The reading control section 40 calculates the reading position which corresponds to the reproduction position which is the normal skip time Tns ahead of the current reproduction position. Then, it instructs the DVD drive 50 to move the optical pickup to the reading position it has calculated. The DVD drive 50 drives the actuator and moves the optical pickup's reading position by the normal skip time Tns from the current reading position.

If the adjustment skip time Tas is determined to be the forward reproduction-position skip time, in the step S32, the reproduction control section 12 instructs the reading control section 40 to move the reading position forward by the adjustment skip time Tas read from the adjustment skip-time storage section 34. The reading control section 40 calculates the reading position which corresponds to the reproduction position which is the adjustment skip time Tas ahead of the current reproduction position. Then, it instructs the DVD drive 50 to move the optical pickup to the reading position it has calculated. The DVD drive 50 drives the actuator and moves the optical pickup's reading position by the adjustment skip time Tas from the current reading position.

Next, in a step S33, the forward-skip elapse-time clocking section 13 clears the forward-skip elapse time stored in the forward-skip elapse-time storage section 35. Then, it starts to clock a forward-skip elapse time afresh. Sequentially, the processing returns to the step S22 so that the reproduction is resumed.

On the other hand, if the decision is made that the forward skip operation has been accepted, in other words, that the backward skip operation has been accepted (NO in the step S27), then in a step S34, the elapse-time decision section 15 reads the forward-skip elapse time stored in the forward-skip elapse-time storage section 35.

Next, in a step S35, the elapse-time decision section 15 decides whether or not the forward-skip elapse time read from the forward-skip elapse-time storage section 35 has exceeded a predetermined time.

If the decision is made that the forward-skip elapse time has exceeded the predetermined time (YES in the step S35), then in a step S36, the skip-time determination section 11 reads the normal skip time Tns stored beforehand in the normal skip-time storage section 33. Then, it determines the normal skip time Tns as the backward reproduction-position skip time.

On the other hand, if the decision is made that the forward-skip elapse time has not exceeded the predetermined time (NO in the step S35), then in a step S37, the skip-time determination section 11 reads the adjustment skip time Tas stored beforehand in the adjustment skip-time storage section 34. Then, it determines the adjustment skip time Tas as the backward reproduction-position skip time.

If the normal skip time Tns is determined to be the backward reproduction-position skip time, in a step S38, the reproduction control section 12 instructs the reading control section 40 to move the reading position backward by the normal skip time Tns read from the normal skip-time storage section 33. The reading control section 40 calculates the reading position which corresponds to the reproduction position which is the normal skip time Tns behind the current reproduction position. Then, it instructs the DVD drive 50 to move the optical pickup to the reading position it has calculated. The DVD drive 50 drives the actuator and moves the optical pickup's reading position by the normal skip time Tns from the current reading position.

If the adjustment skip time Tas is determined to be the backward reproduction-position skip time, in the step S38, the reproduction control section 12 instructs the reading control section 40 to move the reading position backward by the adjustment skip time Tas read from the adjustment skip-time storage section 34. The reading control section 40 calculates the reading position which corresponds to the reproduction position which is the adjustment skip time Tas behind the current reproduction position. Then, it instructs the DVD drive 50 to move the optical pickup to the reading position it has calculated. The DVD drive 50 drives the actuator and moves the optical pickup's reading position by the adjustment skip time Tas from the current reading position.

Next, in a step S39, the backward-skip elapse-time clocking section 14 clears the backward-skip elapse time stored in the backward-skip elapse-time storage section 36. Then, it starts to clock a backward-skip elapse time anew. Sequentially, the processing returns to the step S22 so that the reproduction is resumed.

As described so far, after a forward or backward skip instruction was given, if an instruction has been given for a skip in the direction opposite to the preceding instruction within a predetermined time, then an adjustment skip time is determined on which is shorter than a normal skip time in the case where an instruction has been given for a skip in the direction opposite to the preceding instruction after the predetermined time or more has elapsed. Therefore, in the case where a user executes a backward skip to watch the part which the user wants to view from its beginning after the user executes a forward skip to skip the part which the user does not want to view, or in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Furthermore, a predetermined normal skip time is store in advance, and an adjustment skip time which is shorter than the normal skip time is store in advance. If a forward reproduction-position skip instruction has been accepted and if a clocked backward-skip elapse time has exceeded a predetermined time, then the normal skip time stored beforehand is chosen as the forward reproduction-position skip time. On the other hand, if the forward reproduction-position skip instruction has been accepted and if the clocked backward-skip elapse time has not exceeded the predetermined time, then the adjustment skip time stored beforehand is chosen as the forward reproduction-position skip time. Further, if a backward reproduction-position skip instruction has been accepted and if a clocked forward-skip elapse time has exceeded a predetermined time, then the normal skip time stored beforehand is chosen as the backward reproduction-position skip time. Still Further, if the backward reproduction-position skip instruction has been accepted and if the clocked forward-skip elapse time has not exceeded the predetermined time, then the adjustment skip time stored beforehand is chosen as the backward reproduction-position skip time.

Therefore, after a forward skip instruction was given, if an instruction for a backward skip has been given within a predetermined time, then an adjustment skip time is determined on which is shorter than in the case where a backward skip instruction has been given after the predetermined time or more has elapsed. Therefore, in the case where a user executes a backward skip to watch the part which the user wants to view from its beginning after the user executes a forward skip to skip the part which the user does not want to view, the skip is executed for a shorter skip time. This makes it possible to shorten the waiting time until this part's head is reproduced. Besides, after a backward skip instruction was given, if an instruction for a forward skip has been given within a predetermined time, then an adjustment skip time is determined on which is shorter than in the case where a forward skip instruction has been given after the predetermined time or more has elapsed. Therefore, in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Incidentally, the above described description is given, as an example, in the case where the present invention is applied to a DVD player. However, the present invention can be implemented, in the same way, even in a system which is capable of reading information from a recording medium other than a DVD disk and displaying it.

In addition, the normal skip time Tns and the adjustment skip time Tas not necessarily need to be fixed values. They may also be variable values so that a user can set them. Furthermore, in this embodiment, the adjustment skip time Tas is set to be a smaller value than the normal skip time Tns. However, the present invention is not limited especially to this. The normal skip time Tns may also be set to be a smaller value than the adjustment skip time Tas.

Furthermore, in this embodiment, during a reproduction, if either instruction for the forward reproduction-position skip or the backward reproduction-position skip is accepted, then the reproduction is brought to a stop, the position in which information is read from the recording medium (i.e., DVD disk) is moved by the skip time determined by the skip-time determination section 11, and the reproduction is resumed after the movement of the reading position has been completed. However, the present invention is not limited especially to this. In this embodiment, if either instruction for the forward reproduction-position skip or the backward reproduction-position skip is accepted at a temporary stop, then the position in which information is read from the recording medium (i.e., DVD disk) may also be moved by the skip time determined by the skip-time determination section 11. In that case, only the initial information is reproduced in the moved reading position.

Still further, the DVD player according to this embodiment includes the forward-skip elapse-time clocking section 13, the backward-skip elapse-time clocking section 14, the forward-skip elapse-time storage section 35, and the backward-skip elapse-time storage section 36. However, the present invention is not limited especially to this. It may also be configured so as to include the forward-skip elapse-time clocking section 13 and the forward-skip elapse-time storage section 35 and so as not to include the backward-skip elapse-time clocking section 14 and the backward-skip elapse-time storage section 36.

In this case, the time is clocked which has passed since an instruction for a forward reproduction-position skip was last given. Then, if an instruction is accepted for a backward reproduction-position skip, a decision is made whether or not the time which has elapsed since the forward reproduction-position skip instruction was last given has exceeded a predetermined time. If the decision is made that the elapse time has exceeded the predetermined time, the skip time is determined for a normal skip time. On the other hand, if the decision is made that it has not exceeded the predetermined time, the skip time is determined for an adjustment skip time shorter than the normal skip time.

Furthermore, a predetermined normal skip time is store in advance, and an adjustment skip time which is shorter than the normal skip time is store in advance. If a backward reproduction-position skip instruction has been accepted and if a clocked forward-skip elapse time has exceeded a predetermined time, then the normal skip time stored beforehand is chosen as the backward reproduction-position skip time. On the other hand, if the backward reproduction-position skip instruction has been accepted and if the clocked forward-skip elapse time has not exceeded the predetermined time, then the adjustment skip time stored beforehand is chosen as the backward reproduction-position skip time.

Accordingly, after a forward skip instruction was given, if an instruction for a backward skip has been given within a predetermined time, then an adjustment skip time is determined on which is shorter than in the case where a backward skip instruction has been given after the predetermined time or more has elapsed. Therefore, in the case where a user executes a backward skip to watch the part which the user wants to view from its beginning after the user executes a forward skip to skip the part which the user does not want to view, the skip is executed for a shorter skip time. This makes it possible to shorten the waiting time until this part's head is reproduced.

Similarly, the DVD player according to this embodiment may also be configured so as to include the backward-skip elapse-time clocking section 14 and the backward-skip elapse-time storage section 36 and so as not to include the forward-skip elapse-time clocking section 13 and the forward-skip elapse-time storage section 35.

In this case, the time is clocked which has passed since an instruction for a backward reproduction-position skip was last given. Then, if an instruction is accepted for a forward reproduction-position skip, a decision is made whether or not the time which has elapsed since the backward reproduction-position skip instruction was last given has exceeded a predetermined time. If the decision is made that the elapse time has exceeded the predetermined time, the skip time is determined for a normal skip time. On the other hand, if the decision is made that it has not exceeded the predetermined time, the skip time is determined for an adjustment skip time shorter than the normal skip time.

Furthermore, a predetermined normal skip time is store in advance, and an adjustment skip time which is shorter than the normal skip time is store in advance. If a forward reproduction-position skip instruction has been accepted and if a clocked backward-skip elapse time has exceeded a predetermined time, then the normal skip time stored beforehand is chosen as the forward reproduction-position skip time. On the other hand, if the forward reproduction-position skip instruction has been accepted and if the clocked backward-skip elapse time has not exceeded the predetermined time, then the adjustment skip time stored beforehand is chosen as the forward reproduction-position skip time.

Therefore, after a backward skip instruction was given, if an instruction for a forward skip has been given within a predetermined time, then an adjustment skip time is determined on which is shorter than in the case where a forward skip instruction has been given after the predetermined time or more has elapsed. Therefore, in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Moreover, in this embodiment, the normal skip time Tns is set, for example, at 15 seconds and the adjustment skip time Tas is set, for example, at five seconds. However, the present invention is not limited especially to this. Taking into account an operation delay time which is taken to confirm whether or not the part which a user wants to view has come, the normal skip time Tns may also be set, for example, at 14 seconds and the adjustment skip time Tas may also be set, for example, at six seconds.

Incidentally, the component elements according to this embodiment may also be realized by operating a program in a computer. Such a program may also be recorded in a recording medium.

Third Embodiment

Next, a third embodiment of the present invention will be described. In the second embodiment, the time is clocked which has passed since a forward or backward skip operation. If an instruction has been given for a forward or backward skip operation, a decision is made whether or not the elapse time since the skip operation in the direction opposite to the former skip operation is within a predetermined time. Unless it is within the predetermined time, a normal skip time is determined on. On the other hand, if it is within the predetermined time, an adjustment skip time which is shorter than the normal skip time is determined on. In contrast, in the third embodiment, when an instruction is given for a forward or backward skip operation, even though the elapse time since the skip operation in the direction opposite to the former skip operation is within a predetermined time, if an adjustment skip time is continuously chosen at a predetermined number of times, then after that, a normal skip time is chosen.

Figure 8:
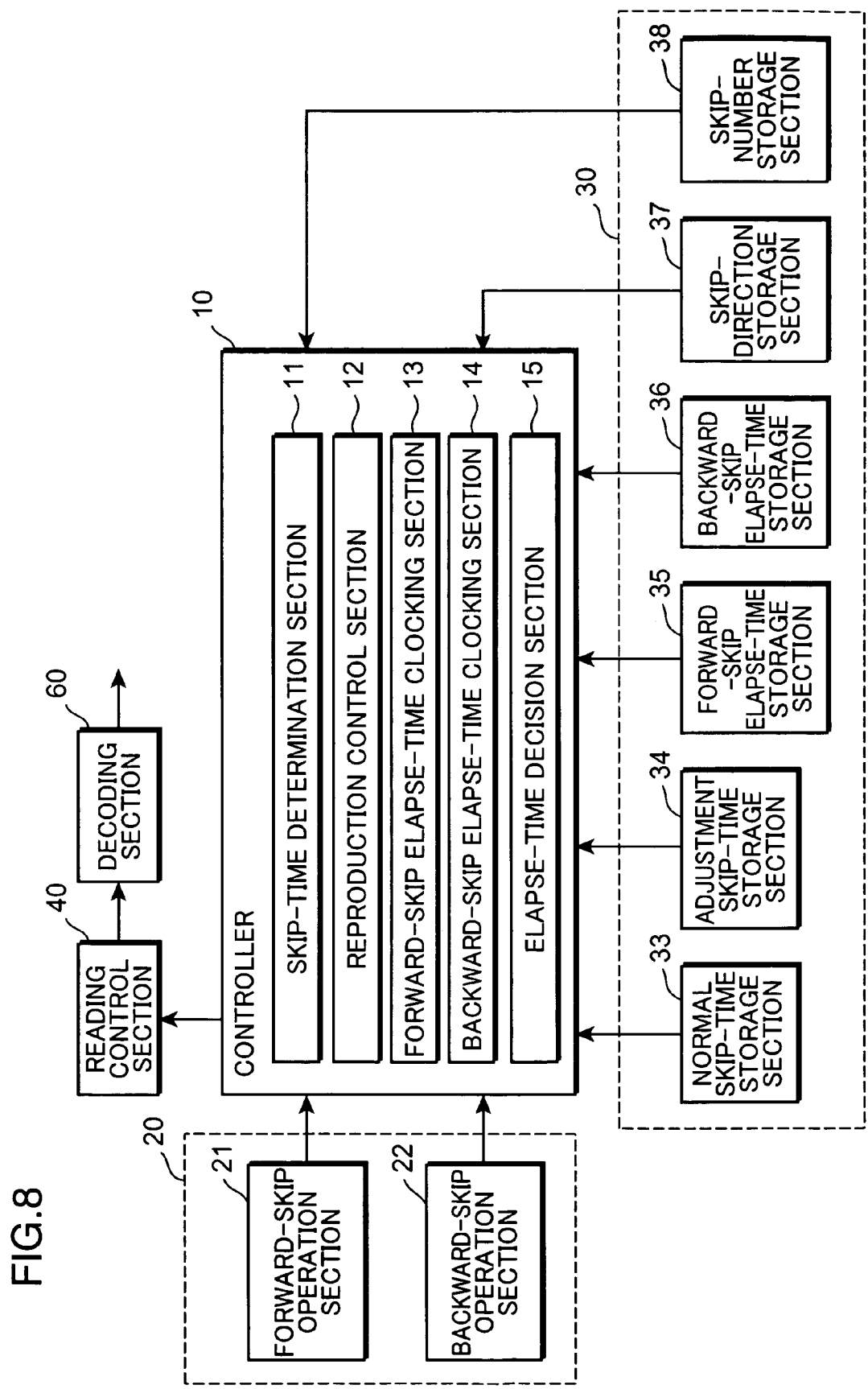
FIG. 8 is a block diagram, showing a detailed configuration of a DVD player according to a third embodiment of the present invention.

FIG. 8 is a block diagram, showing a detailed configuration of a DVD player according to the third embodiment of the present invention. The other component elements not shown in FIG. 8 are the same as those of the first embodiment and the second embodiment. In FIG. 8, the component elements are given the same reference numerals as those of the first embodiment and the second embodiment, as long as the former are identical to the latter. Thus, their description is omitted. A memory 30 includes: a normal skip-time storage section 33; an adjustment skip-time storage section 34; a forward-skip elapse-time storage section 35; a backward-skip elapse-time storage section 36; a skip-direction storage section 37; and a skip-number storage section 38.

The skip-direction storage section 37 stores a skip direction which is last accepted by the forward-skip operation section 21 or the backward-skip operation section 22. The skip-number storage section 38 stores the number of times at which an adjustment skip time is continuously determined by the skip-time determination section 11.

The skip-time determination section 11 chooses an adjustment skip time, if an instruction which is accepted by the forward-skip operation section 21 or the backward-skip operation section 22 is in the opposite direction to the skip direction stored in the skip-direction storage section 37.

Furthermore, the skip-time determination section 11 chooses an adjustment skip time, if an instruction which is accepted by the forward-skip operation section 21 or the backward-skip operation section 22 is for the same direction as the skip direction stored in the skip-direction storage section 37, and unless the number of times at which the adjustment skip time is continuously determined that is stored in the skip-number storage section 38 reaches a predetermined number of times.

Moreover, the skip-time determination section 11 chooses a normal skip time, if an instruction which is accepted by the forward-skip operation section 21 or the backward-skip operation section 22 is for the same direction as the skip direction stored in the skip-direction storage section 37, and if the number of times at which the adjustment skip time is continuously determined that is stored in the skip-number storage section 38 reaches the predetermined number of times.

Herein, in this embodiment, the skip-direction storage section 37 corresponds to an example of the skip-direction storing means, and the skip-number storage section 38 corresponds to an example of the skip-number storing means.

Figure 9:
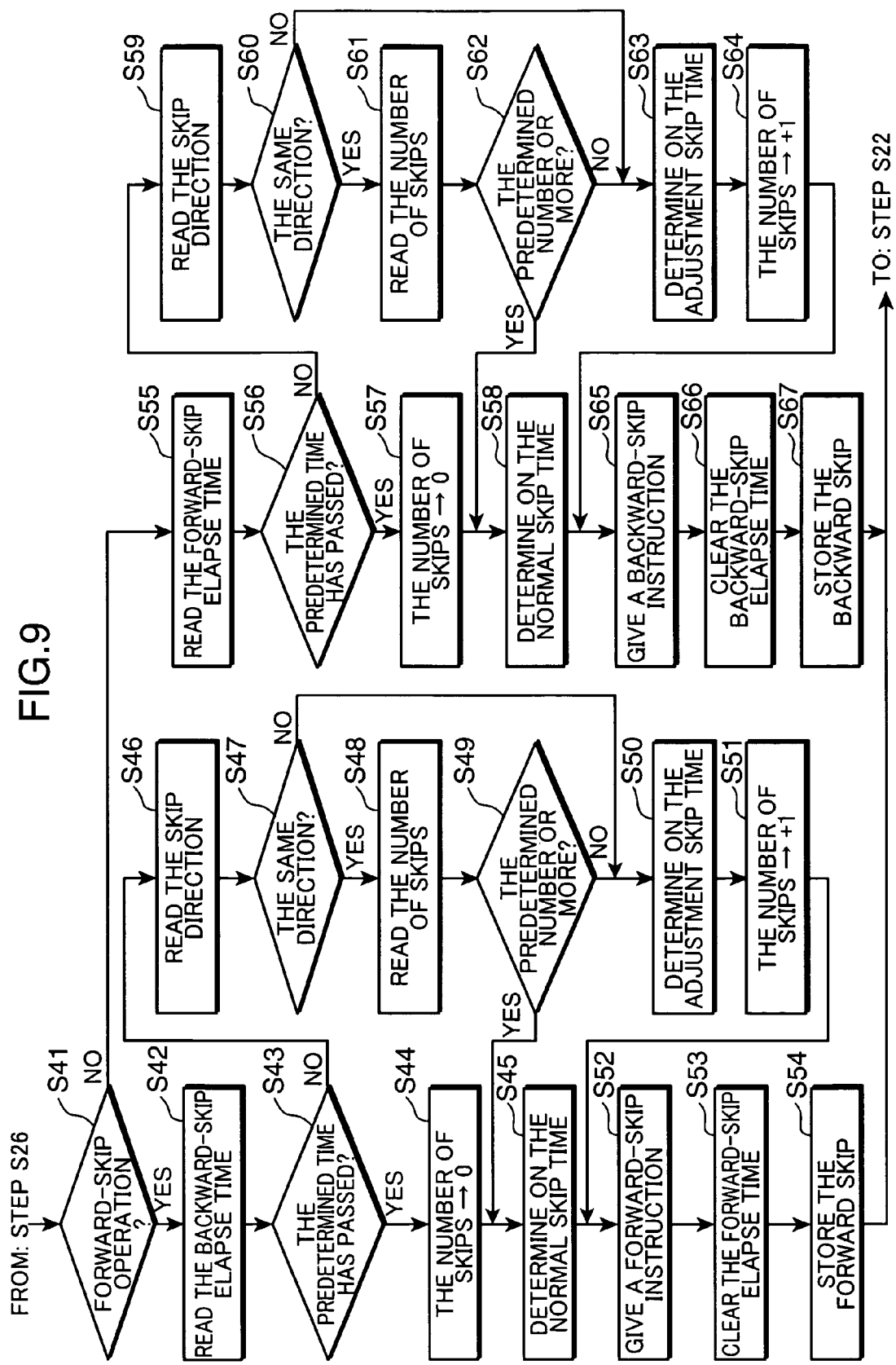
FIG. 9 is a flow chart, showing the processing contents of a controller of the DVD player according to the third embodiment shown in FIG. 8.

FIG. 9 is a flow chart, showing the processing contents of a controller 10 of the DVD player according to the third embodiment shown in FIG. 8. Herein, in terms of the operation of the DVD player according to the third embodiment shown in FIG. 9, its operation from the step S21 to the step S26 is the same as that of the second embodiment shown in FIG. 7. Thus, its illustration and description are omitted and only the processing of a step S27 (or a step S41) and its following steps is described.

In a step S41, the reproduction control section 12 decides whether or not a forward skip operation has been accepted. If the decision is made that the forward skip operation has been accepted (YES in the step S41), then in a step S42, the elapse-time decision section 15 reads the backward-skip elapse time stored in the backward-skip elapse-time storage section 36.

Next, in a step S43, the elapse-time decision section 15 decides whether or not the backward-skip elapse time read from the backward-skip elapse-time storage section 36 has exceeded a predetermined time.

If the decision is made that the backward-skip elapse time has exceeded the predetermined time (YES in the step S43), then in a step S44, the skip-time determination section 11 sets, to zero, the number of skips which is stored in the skip-number storage section 38. Next, in a step S45, the skip-time determination section 11 reads the normal skip time Tns stored beforehand in the normal skip-time storage section 33. Then, it determines the normal skip time Tns as the forward reproduction-position skip time. In this embodiment, the normal skip time Tns is set, for example, at 15 seconds.

On the other hand, if the decision is made that the backward-skip elapse time has not exceeded the predetermined time (NO in the step S43), then in a step S46, the skip-time determination section 11 reads, from the skip-direction storage section 37, the skip direction for which an instruction has last been given. Next, in a step S47, the skip-time determination section 11 decides whether or not the skip direction read from the skip-direction storage section 37 is the same as the skip direction for which an instruction has been given by the forward-skip operation section 21.

If the decision is made that the skip direction read from the skip-direction storage section 37 is the same as the skip direction for which the instruction has been given by the forward-skip operation section 21 (YES in the step S47), then in a step S48, the skip-time determination section 11 reads, from the skip-number storage section 38, the number of times (i.e., the number of skips) at which the adjustment skip time has been continuously determined. Next, in a step S49, the skip-time determination section 11 decides whether or not the number of skips read from the skip-number storage section 38 is a predetermined number of times or above. In this embodiment, the predetermined number of times is set, for example, at three.

If the decision is made that the number of skips is the predetermined number of times or above (YES in the step S49), then in a step S45, the skip-time determination section 11 reads the normal skip time Tns stored beforehand in the normal skip-time storage section 33. Then, it determines the normal skip time Tns as the forward reproduction-position skip time.

On the other hand, if the decision is made that the skip direction read from the skip-direction storage section 37 is not the same as the skip direction for which the instruction has been given by the forward-skip operation section 21 (NO in the step S47), or if the decision is made that the number of skips is below the predetermined number of times (NO in the step S49), then in a step S50, the skip-time determination section 11 reads the adjustment skip time Tas stored beforehand in the adjustment skip-time storage section 34. Then, it determines the adjustment skip time Tas as the forward reproduction-position skip time. In this embodiment, the adjustment skip time Tas is set, for example, at five seconds. Next, in a step S51, the reproduction control section 12 executes an increment of one in the number of skips stored in the skip-number storage section 38.

If the normal skip time Tns is determined to be the forward reproduction-position skip time, in a step S52, the reproduction control section 12 instructs the reading control section 40 to move the reading position forward by the normal skip time Tns read from the normal skip-time storage section 33. In contrast, if the adjustment skip time Tas is determined to be the forward reproduction-position skip time, in the step S52, the reproduction control section 12 instructs the reading control section 40 to move the reading position forward by the adjustment skip time Tas read from the adjustment skip-time storage section 34.

Next, in a step S53, the forward-skip elapse-time clocking section 13 clears the forward-skip elapse time stored in the forward-skip elapse-time storage section 35. Then, it starts to clock a forward-skip elapse time afresh. Sequentially, in a step S54, the reproduction control section 12 stores, in the skip-direction storage section 37, the forward skip as the last-accepted skip direction. Then, the processing returns to the step S22 so that the reading control section 40 resumes the reproduction.

On the other hand, if the decision is made that the forward skip operation has been accepted, in other words, that the backward skip operation has been accepted (NO in the step S41), then in a step S55, the elapse-time decision section 15 reads the forward-skip elapse time stored in the forward-skip elapse-time storage section 35. Next, in a step S56, the elapse-time decision section 15 decides whether or not the forward-skip elapse time read from the forward-skip elapse-time storage section 35 has exceeded a predetermined time.

If the decision is made that the forward-skip elapse time has exceeded the predetermined time (YES in the step S56), then in a step S57, the skip-time determination section 11 sets, to zero, the number of skips which is stored in the skip-number storage section 38. Next, in a step S58, the skip-time determination section 11 reads the normal skip time Tns stored beforehand in the normal skip-time storage section 33. Then, it determines the normal skip time Tns as the backward reproduction-position skip time.

On the other hand, if the decision is made that the forward-skip elapse time has not exceeded the predetermined time (NO in the step S56), then in a step S59, the skip-time determination section 11 reads, from the skip-direction storage section 37, the skip direction for which an instruction has last been given. Next, in a step S60, the skip-time determination section 11 decides whether or not the skip direction read from the skip-direction storage section 37 is the same as the skip direction for which an instruction has been given by the backward-skip operation section 22.

If the decision is made that the skip direction read from the skip-direction storage section 37 is the same as the skip direction for which the instruction has been given by the backward-skip operation section 22 (YES in the step S60), then in a step S61, the skip-time determination section 11 reads, from the skip-number storage section 38, the number of times (i.e., the number of skips) at which the adjustment skip time has been continuously determined. Next, in a step S62, the skip-time determination section 11 decides whether or not the number of skips read from the skip-number storage section 38 is a predetermined number of times or above. If the decision is made that the number of skips is the predetermined number of times or above (YES in the step S62), then in a step S58, the skip-time determination section 11 reads the normal skip time Tns stored beforehand in the normal skip-time storage section 33. Then, it determines the normal skip time Tns as the backward reproduction-position skip time.

On the other hand, if the decision is made that the skip direction read from the skip-direction storage section 37 is not the same as the skip direction for which the instruction has been given by the backward-skip operation section 22 (NO in the step S60), or if the decision is made that the number of skips is below the predetermined number of times (NO in the step S62), then in a step S63, the skip-time determination section 11 reads the adjustment skip time Tas stored beforehand in the adjustment skip-time storage section 34. Then, it determines the adjustment skip time Tas as the backward reproduction-position skip time. Next, in a step S64, the reproduction control section 12 executes an increment of one in the number of skips stored in the skip-number storage section 38.

If the normal skip time Tns is determined to be the backward reproduction-position skip time, in a step S65, the reproduction control section 12 instructs the reading control section 40 to move the reading position backward by the normal skip time Tns read from the normal skip-time storage section 33. In contrast, if the adjustment skip time Tas is determined to be the backward reproduction-position skip time, in the step S65, the reproduction control section 12 instructs the reading control section 40 to move the reading position backward by the adjustment skip time Tas read from the adjustment skip-time storage section 34.

Next, in a step S66, the backward-skip elapse-time clocking section 14 clears the backward-skip elapse time stored in the backward-skip elapse-time storage section 36. Then, it starts to clock a backward-skip elapse time afresh. Sequentially, in a step S67, the reproduction control section 12 stores, in the skip-direction storage section 37, the backward skip as the last-accepted skip direction. Then, the processing returns to the step S22 so that the reading control section 40 resumes the reproduction.

Figure 10:
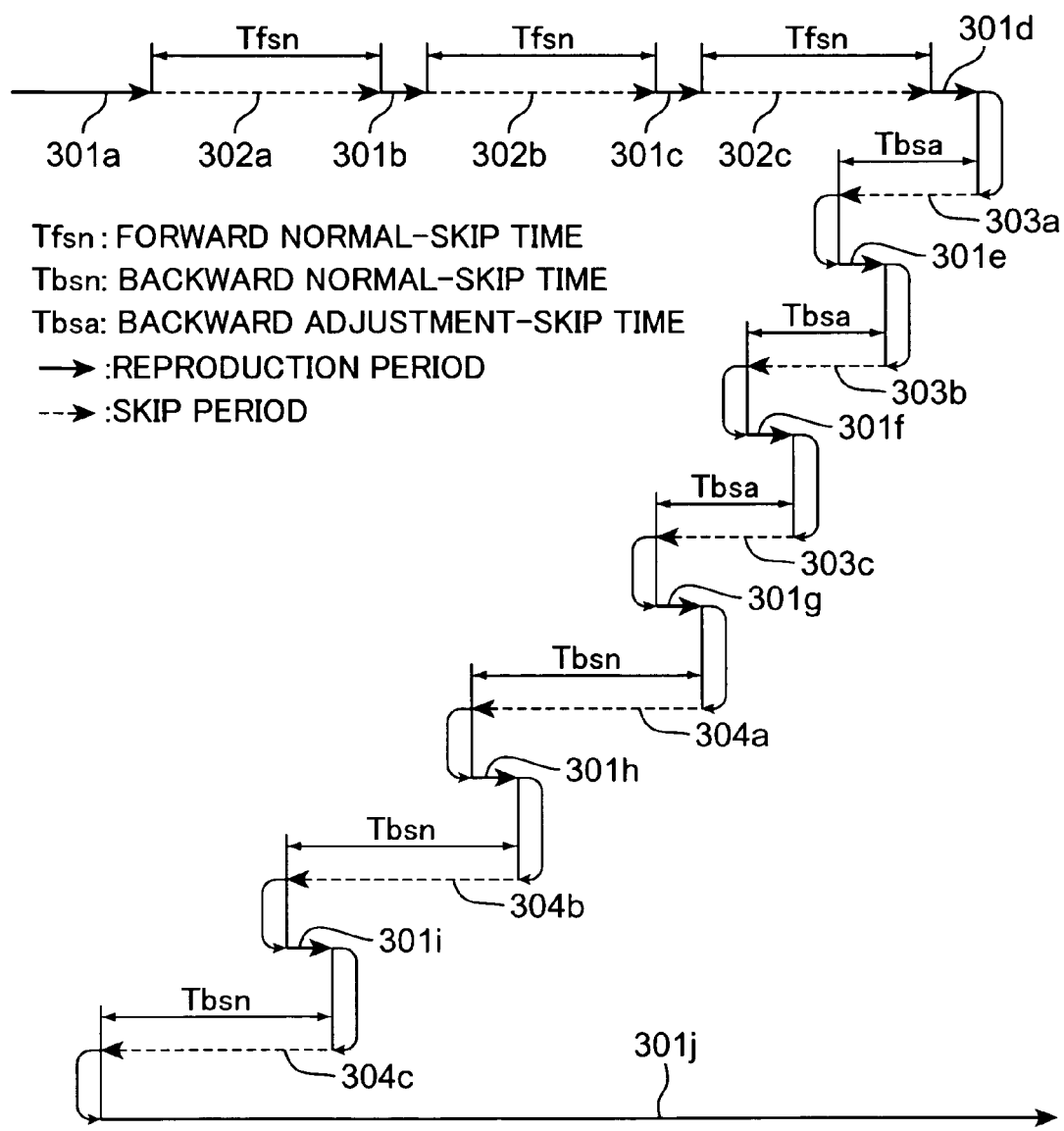
FIG. 10 is an illustration, showing an operation of the DVD player according to the third embodiment of the present invention.

FIG. 10 is an illustration, showing an operation of the DVD player according to the third embodiment of the present invention. In FIG. 10, each solid-line rightward arrow 301a, 301b, 301c, 301d, 301e, 301f, 301g, 301h, 301i, 301j indicates a reproduction processing. Each broken-line rightward arrow 302a, 302b, 302c indicates a forward skip processing, using a normal skip time. Each broken-line leftward arrow 303a, 303b, 303c indicates a backward skip processing, using an adjustment skip time. Each broken-line leftward arrow 304a, 304b, 304c indicates a backward skip processing, using the normal skip time. In addition, reference numeral Tfsn denotes a forward normal skip time; Tbsn, a backward normal skip time; and Tbsa, a backward adjustment skip time.

When the pictures or voices recorded in the DVD disk are reproduced as shown by the solid-line rightward arrow 301a, if the forward-skip operation section 21 is operated, as shown by the broken-line rightward arrow 302a, then a forward skip is executed over the normal skip time Tfsn stored in the normal skip-time storage section 33. Then, when they are reproduced as shown by the solid-line rightward arrow 301b, if the forward-skip operation section 21 is operated, as shown by the broken-line rightward arrow 302b, then a forward skip is executed over the normal skip time Tfsn stored in the normal skip-time storage section 33. Further, when they are reproduced as shown by the solid-line rightward arrow 301c, if the forward-skip operation section 21 is operated, as shown by the broken-line rightward arrow 302c, then a forward skip is executed over the normal skip time Tfsn stored in the normal skip-time storage section 33.

Next, when the generation is in execution as shown by the solid-line rightward arrow 301d, in the case where a user moves the generation position backward from the present generation position, in order to skip to the part which the user wants to watch, the user operates the backward-skip operation section 22. Thereby, as shown by the broken-line leftward arrow 303a, a skip is executed over the adjustment skip time Tbsa stored in the adjustment skip-time storage section 34, and the reproduction is resumed as shown by the solid-line rightward arrow 301e.

At this time, the user becomes aware that the reproduction is still in the part which the user does not want to view. In order to skip to the part which the user wants to watch, the user operates the backward-skip operation section 22. Thereby, as shown by the broken-line leftward arrow 303b, a skip is executed over the adjustment skip time Tbsa stored in the adjustment skip-time storage section 34, and the reproduction is resumed as shown by the solid-line rightward arrow 301f.

Further, the user becomes aware that the reproduction is still in the part which the user does not want to view. In order to skip to the part which the user wants to watch, the user operates the backward-skip operation section 22. Thereby, as shown by the broken-line leftward arrow 303c, a skip is executed over the adjustment skip time Tbsa stored in the adjustment skip-time storage section 34, and the reproduction is resumed as shown by the solid-line rightward arrow 301g.

Herein, if a forward-skip elapse time is within a predetermined time, then the adjustment skip time Tbsa is supposed to be chosen, every time the backward-skip operation section 22 is operated. If the part which the user wants to view is still behind, the user needs to operate the backward-skip operation section 22 many times. This may make the operation complicated. Therefore, the skip-time determination section 11 according to the third embodiment chooses a normal skip time, if an adjustment skip time is chosen in series at a predetermined number of times.

Specifically, in the case where the predetermined number of times is set, for example, at three times, if the backward-skip operation section 22 has been operated when the reproduction is executed as shown by the solid-line rightward arrow 301g, then the skip-time determination section 11 decides that the instruction accepted by the backward-skip operation section 22 is for the same direction as the skip direction stored in the skip-direction storage section 37. Then, the skip-time determination section 11 decides that the number of times at which an adjustment skip time has been continuously determined which is stored in the skip-number storage section 38 has reached a predetermined number of times. Hence, it chooses a normal skip time. Thereby, as shown by the broken-line leftward arrow 304a, a skip is executed over the normal skip time Tbsn stored in the normal skip-time storage section 33, and the reproduction is resumed as shown by the solid-line rightward arrow 301h.

Unless the reproduction position at this time is the reproduction position of the part which the user wants to view, the backward-skip operation section 22 is repeatedly operated so that it comes behind the reproduction position which the user wants. Thereby, as shown by the broken-line leftward arrows 304b and 304c, a backward skip is executed over the normal skip time Tbsn stored in the normal skip-time storage section 33, and the reproduction is resumed as shown by the solid-line rightward arrow 301j.

In this way, the last-accepted skip direction is stored, and the number of times at which the adjustment skip time has been continuously determined is stored. Then, if the accepted instruction is for the direction opposite to the stored skip direction, the adjustment skip time is chosen. On the other hand, if the accepted instruction is for the same direction as the stored skip direction and if the stored number of times at which the adjustment skip time has been continuously determined has not reached the predetermined number of times, then the adjustment skip time is chosen. Further, if the accepted instruction is for the same direction as the stored skip direction and if the stored number of times at which the adjustment skip time has been continuously determined has reached the predetermined number of times, then the normal skip time is chosen.

Accordingly, after a forward or backward skip instruction was given, if an instruction has been given for a skip in the direction opposite to the preceding one within a predetermined time, then an adjustment skip time is determined on which is shorter than in the case where an instruction has been given for a skip in the direction opposite to the preceding one after the predetermined time or more has elapsed. In contrast, if a skip operation has been continuously executed over the adjustment skip time at the predetermined number of times or more times in the same direction, a skip operation is executed over a normal skip time which is longer than the adjustment skip time. Therefore, even if the head of the part which the user wants to view is located farther than the position at the time when the skip operation has been continuously executed over the adjustment skip time at the predetermined number of times in the same direction, then the reproduction position can be quickly moved to the head of the part which the user wants to watch.

Fourth Embodiment

Next, a fourth embodiment of the present invention will be described. In the fourth embodiment, after the preceding skip operation has been completed, the reproduction time is clocked until the following skip operation. If the following skip operation is a forward reproduction-position skip, the time which is obtained by subtracting the reproduction time from a normal skip time is determined on as the skip time. On the other hand, if the following skip operation is a backward reproduction-position skip, the time which is obtained by adding the reproduction time to an adjustment skip time is determined on as the skip time.

Figure 11:
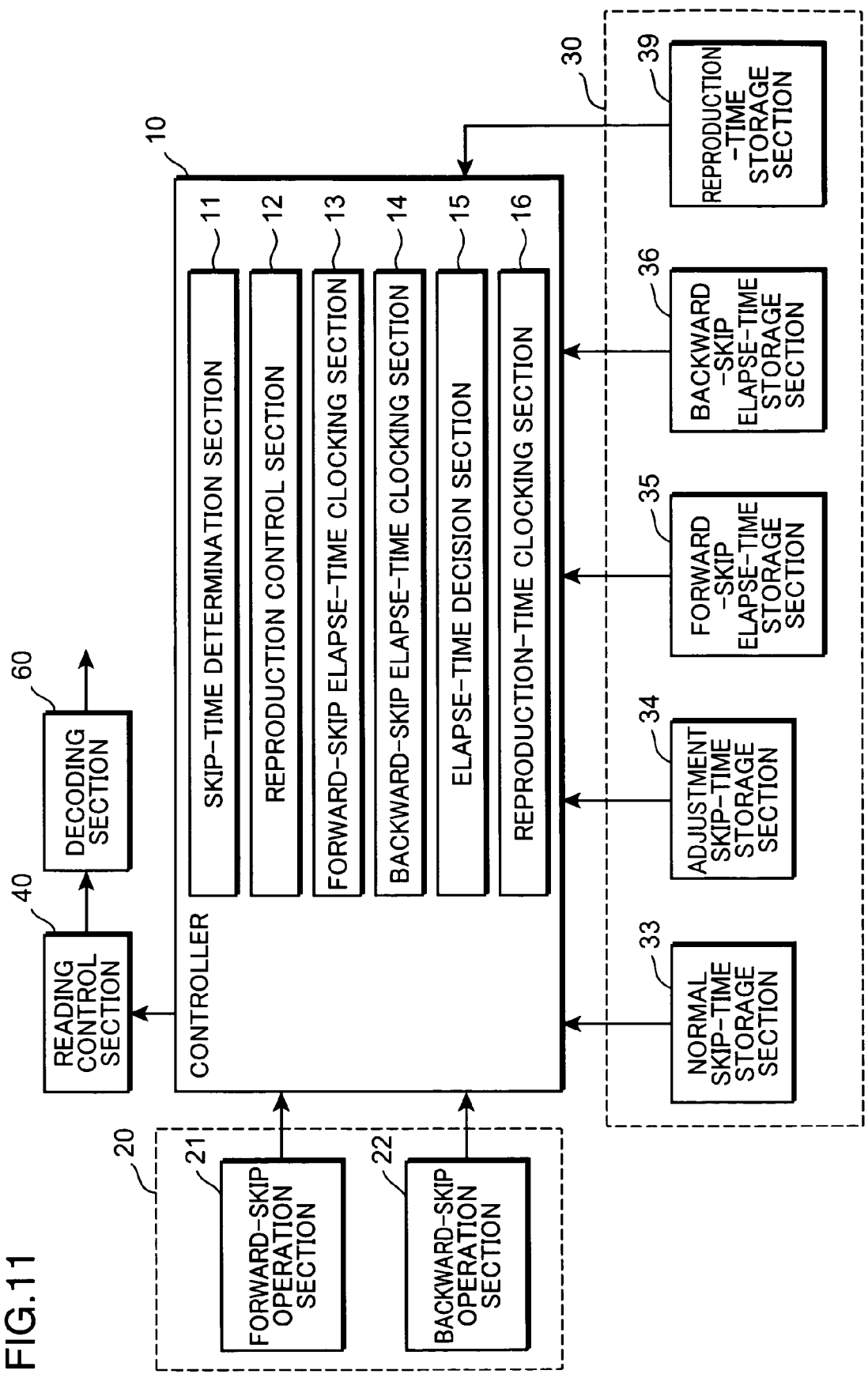
FIG. 11 is a block diagram, showing the configuration of a DVD player according to a fourth embodiment of the present invention.

FIG. 11 is a block diagram, showing the configuration of a DVD player according to the fourth embodiment of the present invention. The other component elements not shown in FIG. 11 are the same as those of the first embodiment, the second embodiment and the third embodiment. In FIG. 11, the component elements are given the same reference numerals as those of the first embodiment, the second embodiment and the third embodiment, as long as the former are identical to the latter. Thus, their description is omitted.

A memory 30 includes: a normal skip-time storage section 33; an adjustment skip-time storage section 34; a forward-skip elapse-time storage section 35; a backward-skip elapse-time storage section 36; and a reproduction-time storage section 39. A controller 10 includes: a skip-time determination section 11; a reproduction control section 12; the forward-skip elapse-time clocking section 13; the backward-skip elapse-time clocking section 14; an elapse-time decision section 15; and a reproduction-time clocking section 16.

The reproduction-time storage section 39 stores the reproduction time from the last skip-operation completion time to the next skip-operation start time. The reproduction-time clocking section 16 clocks the reproduction time from the last skip-operation completion time to the next skip-operation start time. Then, it stores it in the reproduction-time storage section 39.

If the next skip operation is a forward reproduction-position skip, the skip-time determination section 11 determines, as the skip time, the time which is obtained by subtracting the reproduction time clocked by the reproduction-time clocking section 16 from a normal skip time. On the other hand, if the next skip operation is a backward reproduction-position skip, the skip-time determination section 11 determines, as the skip time, the time which is obtained by adding the reproduction time clocked by the reproduction-time clocking section 16 to an adjustment skip time. Herein, in this embodiment, the reproduction-time clocking section 16 corresponds to an example of the reproduction-time clocking means.

Figure 12:
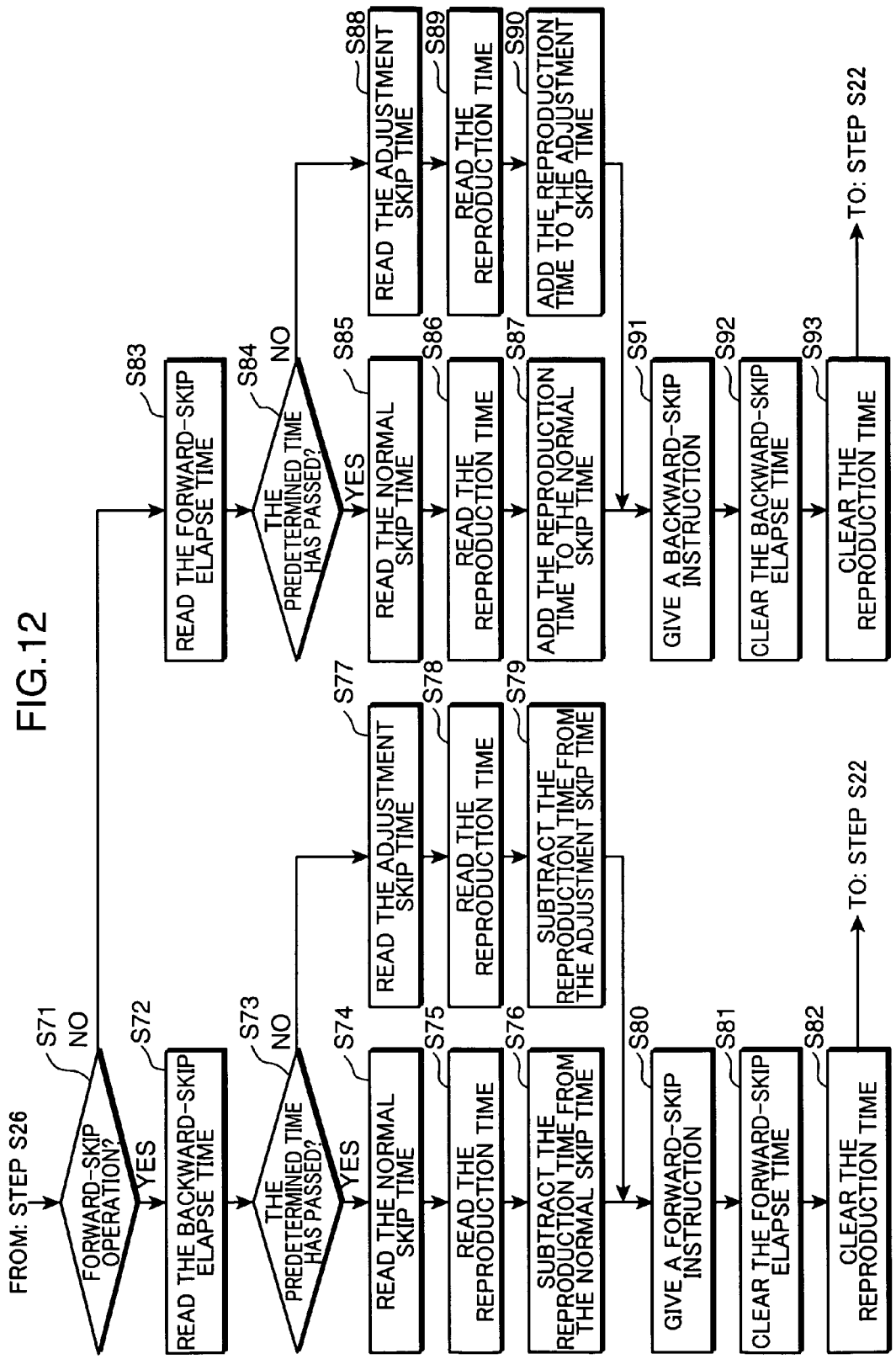
FIG. 12 is a flow chart, showing the processing contents of a controller of the DVD player according to the fourth embodiment shown in FIG. 11.

FIG. 12 is a flow chart, showing the processing contents of the controller 10 of the DVD player according to the fourth embodiment shown in FIG. 11. Herein, in terms of the operation of the DVD player according to the fourth embodiment shown in FIG. 12, its operation from the step S21 to the step S26 is the same as that of the second embodiment shown in FIG. 7. Thus, its illustration and description are omitted and only the processing of a step S27 (or a step S71) and its following steps is described.

In a step S71, the reproduction control section 12 decides whether or not a forward skip operation has been accepted. If the decision is made that the forward skip operation has been accepted (YES in the step S71), then in a step S72, the elapse-time decision section 15 reads the backward-skip elapse time stored in the backward-skip elapse-time storage section 36. Next, in a step S73, the elapse-time decision section 15 decides whether or not the backward-skip elapse time read from the backward-skip elapse-time storage section 36 has exceeded a predetermined time.

If the decision is made that the backward-skip elapse time has exceeded the predetermined time (YES in the step S73), then in a step S74, the skip-time determination section 11 reads the normal skip time Tns stored beforehand in the normal skip-time storage section 33. In this embodiment, the normal skip time Tns is set, for example, at 15 seconds. Sequentially, in a step S75, the skip-time determination section 11 reads the reproduction time t stored in the reproduction-time storage section 39.

Next, in a step S76, the skip-time determination section 11 determines, as the skip time, the time which is left when the reproduction time t read from the reproduction-time storage section 39 is subtracted from the normal skip time Tns read from the normal skip-time storage section 33. At this time, the normal skip time Tns is a greater value than the reproduction time t.

On the other hand, if the decision is made that the backward-skip elapse time has not exceeded the predetermined time (NO in the step S73), then in a step S77, the skip-time determination section 11 reads the adjustment skip time Tas stored beforehand in the adjustment skip-time storage section 34. In this embodiment, the adjustment skip time Tas is set, for example, at five seconds. Sequentially, in a step S78, the skip-time determination section 11 reads the reproduction time t stored in the reproduction-time storage section 39.

Next, in a step S79, the skip-time determination section 11 determines, as the skip time, the time which is left when the reproduction time t read from the reproduction-time storage section 39 is subtracted from the adjustment skip time Tas read from the adjustment skip-time storage section 34. At this time, the adjustment skip time Tas is longer than the reproduction time t.

If the forward reproduction-position skip time is determined for the time left when the reproduction time t is subtracted from the normal skip time Tns, in a step S80, the reproduction control section 12 instructs the reading control section 40 to move the reading position forward by the time which is obtained by subtracting the reproduction time t from the normal skip time Tns read from the normal skip-time storage section 33. On the other hand, if the forward reproduction-position skip time is determined for the time left when the reproduction time t is subtracted from the adjustment skip time Tas, in a step S80, the reproduction control section 12 instructs the reading control section 40 to move the reading position forward by the time which is obtained by subtracting the reproduction time t from the adjustment skip time Tas read from the adjustment skip-time storage section 34.

Next, in a step S81, the forward-skip elapse-time clocking section 13 clears the forward-skip elapse time stored in the forward-skip elapse-time storage section 35. Then, it starts to clock a forward-skip elapse time afresh. Sequentially, in a step S82, the reproduction-time clocking section 16 clears the reproduction time t stored in the reproduction-time storage section 39. Then, the processing returns to the step S22 and the reading control section 40 resumes the reproduction. If the reproduction is resumed, the reproduction-time clocking section 16 begins to clock the reproduction time t.

On the other hand, if the decision is made that the forward skip operation has been accepted, in other words, that the backward skip operation has been accepted (NO in the step S71), then in a step S83, the elapse-time decision section 15 reads the forward-skip elapse time stored in the forward-skip elapse-time storage section 35. Next, in a step S84, the elapse-time decision section 15 decides whether or not the forward-skip elapse time read from the forward-skip elapse-time storage section 35 has exceeded a predetermined time.

If the decision is made that the forward-skip elapse time has exceeded the predetermined time (YES in the step S84), then in a step S85, the skip-time determination section 11 reads the normal skip time Tns stored beforehand in the normal skip-time storage section 33. Sequentially, in a step S86, the skip-time determination section 11 reads the reproduction time t stored in the reproduction-time storage section 39.

Next, in a step S87, the skip-time determination section 11 determines, as the skip time, the time which is made when the reproduction time t read from the reproduction-time storage section 39 is added to the normal skip time Tns read from the normal skip-time storage section 33.

On the other hand, if the decision is made that the backward-skip elapse time has not exceeded the predetermined time (NO in the step S84), then in a step S88, the skip-time determination section 11 reads the adjustment skip time Tas stored beforehand in the adjustment skip-time storage section 34. Sequentially, in a step S89, the skip-time determination section 11 reads the reproduction time t stored in the reproduction-time storage section 39.

Next, in a step S90, the skip-time determination section 11 determines, as the skip time, the time made when the reproduction time t read from the reproduction-time storage section 39 is added to the adjustment skip time Tas read from the adjustment skip-time storage section 34.

If the backward reproduction-position skip time is determined for the time made when the reproduction time t is added to the normal skip time Tns, in a step S91, the reproduction control section 12 instructs the reading control section 40 to move the reading position backward by the time which is obtained by adding the reproduction time t to the normal skip time Tns read from the normal skip-time storage section 33. On the other hand, if the backward reproduction-position skip time is determined for the time made when the reproduction time t is added to the adjustment skip time Tas, in a step S91, the reproduction control section 12 instructs the reading control section 40 to move the reading position backward by the time which is obtained by adding the reproduction time t to the adjustment skip time Tas read from the adjustment skip-time storage section 34.

Next, in a step S92, the backward-skip elapse-time clocking section 14 clears the backward-skip elapse time stored in the backward-skip elapse-time storage section 36. Then, it starts to clock a backward-skip elapse time afresh. Sequentially, in a step S93, the reproduction-time clocking section 16 clears the reproduction time t stored in the reproduction-time storage section 39. Then, the processing returns to the step S22 and the reading control section 40 resumes the reproduction. If the reproduction is resumed, the reproduction-time clocking section 16 begins to clock the reproduction time t.

In this way, the reproduction time is clocked from the last skip-operation completion time to the next skip-operation start time. If the next skip operation is a forward reproduction-position skip, the time which is obtained by subtracting the clocked reproduction time from the normal skip time is determined on as the skip time. On the other hand, if the next skip operation is a backward reproduction-position skip, the time which is obtained by adding the clocked reproduction time to the adjustment skip time is determined on as the skip time. Therefore, the skip time can be determined, taking into account the reproduction time which a user takes to confirm whether a skip has been executed to the part which the user wants to view.

Figure 13:
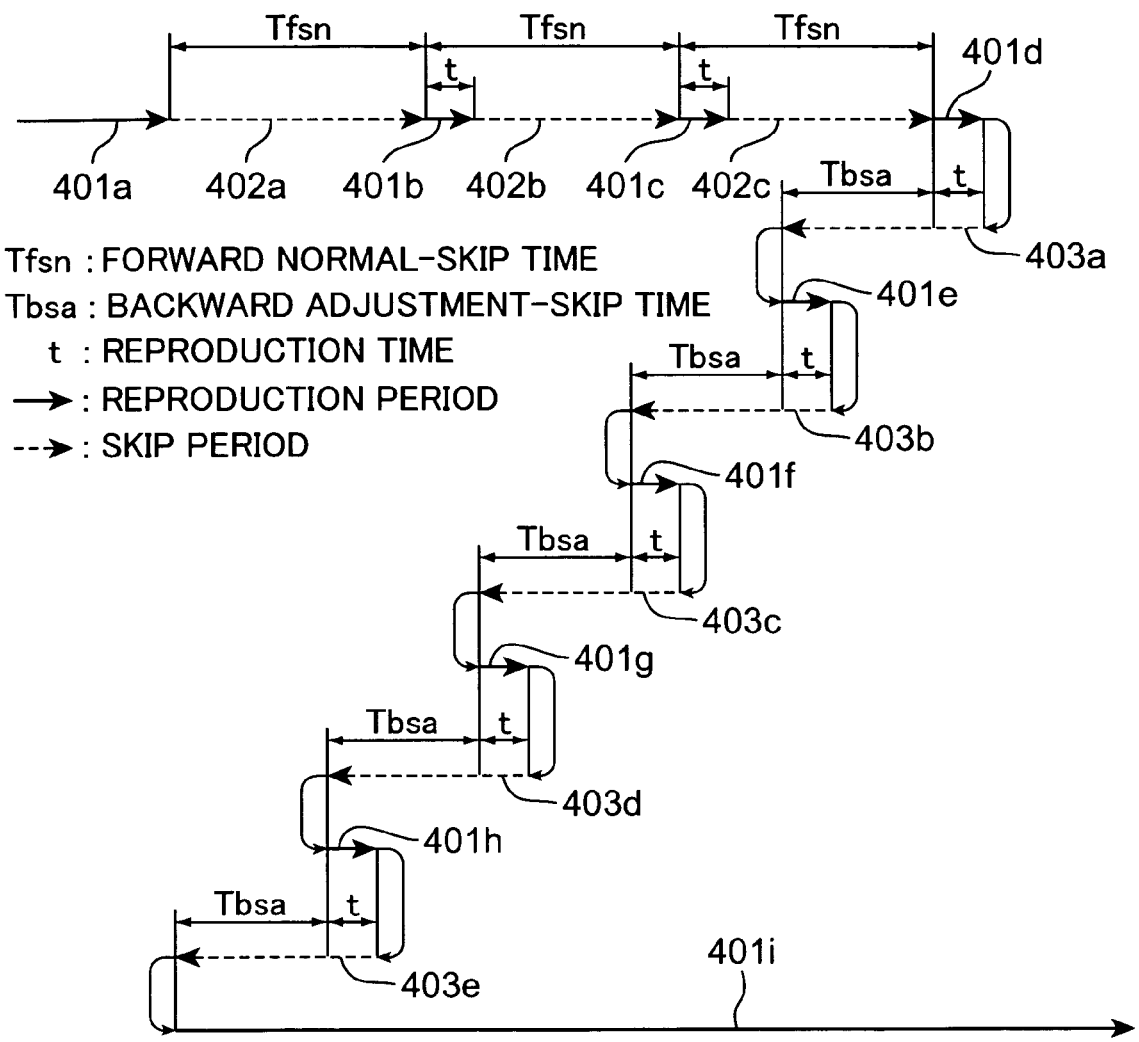
FIG. 13 is an illustration, showing an operation of the DVD player according to the fourth embodiment of the present invention.

FIG. 13 is an illustration, showing an operation of the DVD player according to the fourth embodiment of the present invention. In FIG. 13, each solid-line rightward arrow 401a, 401b, 401c, 401d, 401e, 401f, 401g, 401h, 401i indicates a reproduction processing. Each broken-line rightward arrow 402a, 402b, 402c indicates a forward skip processing, using a normal skip time. Each broken-line leftward arrow 403a, 403b, 403c, 403d, 403e indicates a backward skip processing, using an adjustment skip time. In addition, reference numeral Tfsn denotes a forward normal skip time; Tbsa, a backward adjustment skip time; and t, a reproduction time.

When the pictures or voices recorded in the DVD disk are reproduced as shown by the solid-line rightward arrow 401a, if the forward-skip operation section 21 is operated, as shown by the broken-line rightward arrow 402a, then a forward skip is executed over the normal skip time Tfsn stored in the normal skip-time storage section 33. Then, when they are reproduced as shown by the solid-line rightward arrow 401b, if the forward-skip operation section 21 is operated, as shown by the broken-line rightward arrow 402b, then a forward skip is executed over the time (Tfsn-t) which is obtained by subtracting the reproduction time t from the normal skip time Tfsn stored in the normal skip-time storage section 33. Further, when they are reproduced as shown by the solid-line rightward arrow 401c, if the forward-skip operation section 21 is operated, as shown by the broken-line rightward arrow 402c, then a forward skip is executed over the time (Tfsn-t) obtained by subtracting the reproduction time t from the normal skip time Tfsn stored in the normal skip-time storage section 33.

Next, when the generation is in execution as shown by the solid-line rightward arrow 401d, in the case where a user moves the generation position backward from the present generation position, in order to skip to the part which the user wants to watch, the user operates the backward-skip operation section 22. Thereby, as shown by the broken-line leftward arrow 403a, a skip is executed over the time (Tbsa+t) which is obtained by adding the reproduction time t to the adjustment skip time Tbsa stored in the adjustment skip-time storage section 34, and the reproduction is resumed as shown by the solid-line rightward arrow 401e.

At this time, the user becomes aware that the reproduction is still in the part which the user does not want to view. In order to skip to the part which the user wants to watch, the user operates the backward-skip operation section 22. Thereby, as shown by the broken-line leftward arrow 403b, a skip is executed over the time (Tbsa+t) obtained by adding the reproduction time t to the adjustment skip time Tbsa stored in the adjustment skip-time storage section 34, and the reproduction is resumed as shown by the solid-line rightward arrow 401f.

Unless the reproduction position at this time is the reproduction position of the part which the user wants to view, the backward-skip operation section 22 is repeatedly operated so that it comes behind the reproduction position which the user wants. Thereby, as shown by the broken-line leftward arrow 403c, 403d, 403e, a skip is executed over the time (Tbsa+t) which is obtained by adding the reproduction time t to the adjustment skip time Tbsa stored in the adjustment skip-time storage section 34, and the reproduction is resumed as shown by the solid-line rightward arrow 401i.

FIGS. 14A and 14B illustrate a concrete operation of the DVD player according to the fourth embodiment of the present invention. FIG. 14A is an illustration, showing a television program which is stored in a DVD disk that is set in the DVD drive 50. FIG. 14B is an illustration, showing a reproduction and a skip. In FIG. 14A, a belt 510 indicates the television program recorded in the DVD disk; white belts 501, 505, the television program itself; and hatched belts 502, 503, 504, commercial messages (or CMs). The time of each commercial message is 15 seconds.

In FIG. 14B, each solid-line rightward arrow 504a, 504b, 504c, 504d, 504e indicates a reproduction processing. Each broken-line rightward arrow 505a, 505b, 505c indicates a forward skip processing. A broken-line leftward arrow 506 indicates a backward skip processing.

Herein, let's assume that the part which a user wants to watch is a television program itself and the part which the user does not want to watch is a commercial message. In the television program 510 recorded in the DVD disk, as an example, by taking up the operation for skipping the commercial messages 502, 503, 504, an operation will be described about the DVD player according to the fourth embodiment of the present invention. In FIG. 14B, the forward normal skip time Tfsn is 15 seconds and the backward adjustment skip time Tbsa is five seconds.

When the television program itself 501 recorded in the DVD disk is reproduced as shown by the solid-line rightward arrow 504a, in the position shown by timing T501 which is two seconds after the beginning of the commercial message 502, the user notices that the commercial message 502 has come. In order to skip to the television program itself 505, the user operates the forward-skip operation section 21. Thereby, as shown by the broken-line rightward arrow 505a, a skip is executed over the forward normal skip time Tfsn stored in the normal skip-time storage section 33, and from the position shown by timing T502, the reproduction is resumed as shown by the solid-line rightward arrow 504b. At this time, the time from the timing T501 to the timing T502 is 15 seconds.

Next, in the position shown by timing T503 after the elapse of two seconds from the timing T502, the user becomes aware that the reproduction is still in the commercial message 503. In order to skip to the television program itself 505, the user further operates the forward-skip operation section 21. Thereby, as shown by the broken-line rightward arrow 505b, a skip is executed over the time which is obtained by subtracting the reproduction time t from the forward normal skip time Tfsn stored in the forward normal skip-time storage section 33, Then, from the position shown by timing T504, the reproduction is resumed as shown by the solid-line rightward arrow 504c. At this time, the time from the timing T502 to the timing T504 is 15 seconds.

Sequentially, in the position shown by timing T505 after the elapse of two seconds from the timing T504, the user becomes aware that the reproduction is still in the commercial message 504. In order to skip to the television program itself 505, the user further operates the forward-skip operation section 21. Thereby, as shown by the broken-line rightward arrow 505c, a skip is executed over the time which is obtained by subtracting the reproduction time t from the forward normal skip time Tfsn stored in the normal skip-time storage section 33. Then, from the position shown by timing T506, the reproduction is resumed as shown by the solid-line rightward arrow 504d. At this time, the time from the timing T504 to the timing T506 is 15 seconds.

Next, in the position shown by timing T507 after the elapse of two seconds from the timing T506, the user becomes aware that a skip has been executed to the television program itself 505. In order to view the television program itself 505 from the beginning shown by timing T509, the user operates the backward-skip operation section 22. Thereby, as shown by the broken-line leftward arrow 506, a skip is executed over the time which is obtained by adding the reproduction time t to the backward adjustment skip time Tbsa stored in the adjustment skip-time storage section 34. Then, from the position shown by timing T508, the reproduction is resumed as shown by the solid-line rightward arrow 504*e*. At this time, the time from the timing T507 to the timing T508 is seven seconds. In the reproduction state, the user waits to reach the head of the television program itself 505 for a period Tw6 (i.e., three seconds) from the timing T508 to the timing T509. Then, the user watches the television program itself 505.

Herein, in this embodiment, if the reproduction time t is within the normal skip time Tfsn (or the adjustment skip time), a forward skip is executed over the time obtained by subtracting the reproduction time t from the normal skip time Tfsn (or the adjustment skip time). However, the present invention is not limited especially to this. The skip-time determination section 11 decides whether or not the reproduction time t is within a predetermined time. If it is within the predetermined time, it may also determine, as the skip time, the time which is obtained by subtracting the reproduction time t from the normal skip time Tfsn (or the adjustment skip time). On the other hand, unless it is within the predetermined time, it may also determine the normal skip time Tfsn (or the adjustment skip time) as the skip time.

Furthermore, in this embodiment, if the next skip operation is a forward reproduction-position skip, the skip-time determination section 11 determines, as the skip time, the time which is obtained by subtracting the clocked reproduction time from the normal skip time. On the other hand, if the next skip operation is a backward reproduction-position skip, the skip-time determination section 11 determines, as the skip time, the time which is obtained by adding the clocked reproduction time to the adjustment skip time. However, the present invention is not limited especially to this. If the next skip operation is a forward reproduction-position skip, the skip-time determination section 11 may also determine, as the skip time, the time which is obtained by subtracting the clocked reproduction time from the normal skip time. On the other hand, if the next skip operation is a backward reproduction-position skip, the skip-time determination section 11 may also determine the adjustment skip time as the skip time.

Moreover, if the next skip operation is a forward reproduction-position skip, the skip-time determination section 11 may also determine the normal skip time as the skip time. On the other hand, if the next skip operation is a backward reproduction-position skip, the skip-time determination section 11 may also determine, as the skip time, the time which is obtained by adding the clocked reproduction time to the adjustment skip time.

Incidentally, the above described specific embodiments mainly include the invention which has the following configurations.

A reproduction apparatus according to the present invention, characterized by including: a reproducing means for reading information stored in a recording medium and reproducing this information; a skip-operation accepting means for arbitrarily accepting either instruction for a forward reproduction-position skip or a backward reproduction-position skip; a skip-time determining means for making a skip time for either of the forward reproduction-position skip and the backward reproduction-position skip longer than a skip time for the other, and determining a skip time based on either of the instruction for the forward reproduction-position skip and the instruction for the backward reproduction-position skip which is accepted by the skip-operation accepting means; and a controlling means for, if the skip-operation accepting means accepts either instruction for the forward reproduction-position skip or the backward reproduction-position skip during a reproduction in the reproducing means, then stopping the reproduction in the reproducing means, moving the position in which the reproducing means reads information from the recording medium by the skip time determined by the skip-time determining means, and resuming the reproduction after the movement of the reading position is completed.

A reproduction method according to the present invention, characterized by including: a reproducing step of reading information stored in a recording medium and reproducing this information; a skip-operation accepting step of arbitrarily accepting either instruction for a forward reproduction-position skip or a backward reproduction-position skip; a skip-time determining step of making a skip time for either of the forward reproduction-position skip and the backward reproduction-position skip longer than a skip time for the other, and determining a skip time based on either of the instruction for the forward reproduction-position skip and the instruction for the backward reproduction-position skip which is accepted in the skip-operation accepting step; and a controlling step of, if either instruction for the forward reproduction-position skip or the backward reproduction-position skip is accepted during a reproduction, then stopping the reproduction, moving the position in which information is read from the recording medium by the skip time determined in the skip-time determining step, and resuming the reproduction after the movement of the reading position is completed.

A reproduction program according to the present invention, characterized by allowing a computer to function as: a reproducing means for reading information stored in a recording medium and reproducing this information; a skip-operation accepting means for arbitrarily accepting either instruction for a forward reproduction-position skip or a backward reproduction-position skip; a skip-time determining means for making a skip time for either of the forward reproduction-position skip and the backward reproduction-position skip longer than a skip time for the other, and determining a skip time based on either of the instruction for the forward reproduction-position skip and the instruction for the backward reproduction-position skip which is accepted by the skip-operation accepting means; and a controlling means for, if the skip-operation accepting means accepts either instruction for the forward reproduction-position skip or the backward reproduction-position skip during a reproduction in the reproducing means, then stopping the reproduction in the reproducing means, moving the position in which the reproducing means reads information from the recording medium by the skip time determined by the skip-time determining means, and resuming the reproduction after the movement of the reading position is completed.

A computer-readable recording medium in which a reproduction program is stored according to the present invention, characterized by allowing a computer to function as: a reproducing means for reading information stored in a recording medium and reproducing this information; a skip-operation accepting means for arbitrarily accepting either instruction for a forward reproduction-position skip or a backward reproduction-position skip; a skip-time determining means for making a skip time for either of the forward reproduction-position skip and the backward reproduction-position skip longer than a skip time for the other, and determining a skip time based on either of the instruction for the forward reproduction-position skip and the instruction for the backward reproduction-position skip which is accepted by the skip-operation accepting means; and a controlling means for, if the skip-operation accepting means accepts either instruction for the forward reproduction-position skip or the backward reproduction-position skip during a reproduction in the reproducing means, then stopping the reproduction in the reproducing means, moving the position in which the reproducing means reads information from the recording medium by the skip time determined by the skip-time determining means, and resuming the reproduction after the movement of the reading position is completed.

According to this configuration, information stored in a recording medium is read and this information is reproduced. Then, either instruction for a forward reproduction-position skip or a backward reproduction-position skip is arbitrarily accepted. Next, a skip time for either of the forward reproduction-position skip and the backward reproduction-position skip is made longer than a skip time for the other, and a skip time is determined based on either of the instruction for the forward reproduction-position skip and the instruction for the backward reproduction-position skip which has been accepted. During a reproduction, if either instruction for the forward reproduction-position skip or the backward reproduction-position skip is accepted, then the reproduction is brought to a stop, the position in which information is read from the recording medium is moved by the determined skip time, and the reproduction is resumed after the movement of the reading position has been completed.

In this way, the skip time is determined based on whether the accepted skip is forward or backward. Besides, the skip time for either of the forward reproduction-position skip and the backward reproduction-position skip is made longer than the skip time for the other. Accordingly, the forward skip time becomes longer than the backward skip time. In order to skip the part which a user does not want to view, the user repeatedly gives an instruction for the forward skip. Thereafter, the user executes the backward skip, so that the user can watch the part which the user wants to view, from its beginning. In this case, the skip time is determined so that the backward skip time becomes shorter than the forward skip time. This helps shorten the user's waiting time until the head of the part which the user wants to view is reproduced.

Furthermore, in the above described reproduction apparatus, it is preferable that if the skip-operation accepting means accepts either instruction for the forward reproduction-position skip or the backward reproduction-position skip during a temporary stop in the reproducing means, then the controlling means move the position in which the reproducing means reads information from the recording medium by the skip time determined by the skip-time determining means, and reproduce only the first information in the reading position after the movement.

According to this configuration, if either instruction for the forward reproduction-position skip or the backward reproduction-position skip is accepted at a temporary stop, then the position in which information is read from the recording medium is moved by the determined skip time. Then, only the initial information is reproduced in the moved reading position. Therefore, a user can confirm a picture which is displayed at a temporary stop and skip the reproduction position simultaneously. Hence, there is no need for the reproduction time which is taken to confirm the reproduction position after the skip operation.

Moreover, in the above described reproduction apparatus, preferably: the reproduction apparatus should further include, a forward skip-time storing means for storing the forward reproduction-position skip time in advance, and a backward skip-time storing means for storing the backward reproduction-position skip time in advance; and if the skip-operation accepting means accepts the forward reproduction-position skip instruction, the skip-time determining means should choose the forward reproduction-position skip time stored in the forward skip-time storing means, and if the skip-operation accepting means accepts the backward reproduction-position skip instruction, the skip-time determining means should choose the backward reproduction-position skip time stored in the backward skip-time storing means.

According to this configuration, the forward reproduction-position skip time is stored in advance and the backward reproduction-position skip time is stored beforehand. Then, if a forward skip instruction is accepted, the forward reproduction-position skip time stored in advance is chosen. In contrast, if a backward reproduction-position skip instruction is accepted, the backward reproduction-position skip time stored beforehand is chosen. In sum, the skip time which is stored in advance is chosen. Therefore, the skip time which corresponds to the forward or backward reproduction-position skip operation can be easily determined.

In addition, in the above described reproduction apparatus, it is preferable that the forward skip-time storing means store in advance the forward reproduction-position skip time which is a greater value than the backward reproduction-position skip time stored in advance in the backward skip-time storing means.

According to this configuration, the value of the forward reproduction-position skip time is greater than that of the backward reproduction-position skip time, and they are stored beforehand. Thereafter, the user executes the backward skip, so that the user can watch the part which the user wants to view, from its beginning. In this case, the skip time is determined so that the backward skip time becomes shorter than the forward skip time. This helps shorten the user's waiting time until the beginning of the part which the user wants to view is reproduced.

Furthermore, in the above described reproduction apparatus, preferably, the backward skip-time storing means should store in advance the backward reproduction-position skip time which is a greater value than the forward reproduction-position skip time stored in advance in the forward skip-time storing means.

According to this configuration, the backward reproduction-position skip time is stored in advance which is a greater value than the forward reproduction-position skip time. Therefore, in order to skip the part which a user does not want to view, the user repeatedly gives an instruction for the backward skip. Thereafter, the user executes the forward skip, so that the user can watch the part which the user wants to view, from its beginning. In this case, the skip time is determined so that the forward skip time becomes shorter than the backward skip time. Hence, the part which the user wants to view can be prevented from being reproduced after passing its beginning. Therefore, the user can easily pinpoint the head of the part which the user wants to view.

Moreover, in the above described reproduction apparatus, it is preferable that: the reproduction apparatus further include, a forward skip-operation elapse-time clocking means for clocking the time which elapses after the last instruction is given for the forward reproduction-position skip, and a backward-skip deciding means for deciding whether or not the elapse time clocked by the forward skip-operation elapse-time clocking means has exceeded a predetermined time, if the skip-operation accepting means accepts the backward reproduction-position skip instruction; and if the backward-skip deciding means decides that the predetermined time has elapsed, the skip-time determining means determine a predetermined first skip time, and if the backward-skip deciding means decides that the predetermined time had not elapsed, the skip-time determining means determine a second skip time shorter than the first skip time.

According to this configuration, the time is clocked which has passed since an instruction for a forward reproduction-position skip was last given. Then, if an instruction is accepted for a backward reproduction-position skip, a decision is made whether or not the time which has elapsed since the forward reproduction-position skip instruction was last given has exceeded a predetermined time. If the decision is made that the elapse time has exceeded the predetermined time, the skip time is determined for the predetermined first skip time. On the other hand, if the decision is made that it has not exceeded the predetermined time, the skip time is determined for the second skip time shorter than the first skip time.

Accordingly, after a forward skip instruction was given, if an instruction for a backward skip has been given within a predetermined time, then the second skip time is determined on which is shorter than in the case where a backward skip instruction has been given after the predetermined time or more has elapsed. Therefore, in the case where a user executes a backward skip to watch the part which the user wants to view from its beginning after the user executes a forward skip to skip the part which the user does not want to view, the skip is executed for a shorter skip time. This makes it possible to shorten the waiting time until this part's head is reproduced.

In addition, in the above described reproduction apparatus, preferably: the reproduction apparatus should further include, a first skip-time storing means for storing the predetermined first skip time in advance, and a second skip-time storing means for storing in advance the second skip time shorter than the first skip time; and the skip-time determining means, if the skip-operation accepting means accepts the backward reproduction-position skip instruction and if the forward skip-operation elapse time clocked by the forward skip-operation elapse-time clocking means has exceeded the predetermined time, then should choose the first skip time stored in advance in the first skip-time storing means as the backward reproduction-position skip time, and if the skip-operation accepting means accepts the backward reproduction-position skip instruction and if the forward skip-operation elapse time clocked by the forward skip-operation elapse-time clocking means has not exceeded the predetermined time, then should choose the second skip time stored in advance in the second skip-time storing means as the backward reproduction-position skip time.

According to this configuration, the predetermined first skip time is store in advance, and the second skip time which is shorter than the first skip time is store in advance. If a backward reproduction-position skip instruction has been accepted and if the clocked forward skip-operation elapse time has exceeded a predetermined time, then the first skip time stored beforehand is chosen as the backward reproduction-position skip time. On the other hand, if the backward reproduction-position skip instruction has been accepted and if the clocked forward skip-operation elapse time has not exceeded the predetermined time, then the second skip time stored beforehand is chosen as the backward reproduction-position skip time.

Accordingly, after a forward skip instruction was given, if an instruction for a backward skip has been given within a predetermined time, then a second skip time is determined on which is shorter than in the case where a backward skip instruction has been given after the predetermined time or more has elapsed. Therefore, in the case where the user executes a backward skip to watch the part which the user wants to view from its beginning after the user executes a forward skip to skip the part which the user does not want to view, the skip is executed for a shorter skip time. This makes it possible to shorten the waiting time until this part's head is reproduced.

Furthermore, in the above described reproduction apparatus, it is preferable that: the reproduction apparatus further include, a backward skip-operation elapse-time clocking means for clocking the time which elapses after the last instruction is given for the backward reproduction-position skip, and a forward-skip deciding means for deciding whether or not the elapse time clocked by the backward skip-operation elapse-time clocking means has exceeded a predetermined time, if the skip-operation accepting means accepts the forward reproduction-position skip instruction; and if the forward-skip deciding means decides that the predetermined time has elapsed, the skip-time determining means determine a predetermined first skip time, and if the forward-skip deciding means decides that the predetermined time had not elapsed, the skip-time determining means determine a second skip time shorter than the first skip time.

According to this configuration, the time is clocked which has passed since an instruction for a backward reproduction-position skip was last given. Then, if an instruction is accepted for a forward reproduction-position skip, a decision is made whether or not the time which has elapsed since the backward reproduction-position skip instruction was last given has exceeded a predetermined time. If the decision is made that the elapse time has exceeded the predetermined time, the skip time is determined for the predetermined first skip time. On the other hand, if the decision is made that it has not exceeded the predetermined time, the skip time is determined for the second skip time shorter than the first skip time.

Therefore, after a backward skip instruction was given, if an instruction for a forward skip has been given within a predetermined time, then a second skip time is determined on which is shorter than in the case where a forward skip instruction has been given after the predetermined time or more has elapsed. Therefore, in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Moreover, in the above described reproduction apparatus, preferably: the reproduction apparatus should further include, a first skip-time storing means for storing the predetermined first skip time in advance, and a second skip-time storing means for storing in advance the second skip time shorter than the first skip time; and the skip-time determining means, if the skip-operation accepting means accepts the forward reproduction-position skip instruction and if the backward skip-operation elapse time clocked by the backward skip-operation elapse-time clocking means has exceeded the predetermined time, then should choose the first skip time stored in advance in the first skip-time storing means as the forward reproduction-position skip time, and if the skip-operation accepting means accepts the forward reproduction-position skip instruction and if the backward skip-operation elapse time clocked by the backward skip-operation elapse-time clocking means has not exceeded the predetermined time, then should choose the second skip time stored in advance in the second skip-time storing means as the forward reproduction-position skip time.

According to this configuration, the predetermined first skip time is store in advance, and the second skip time which is shorter than the first skip time is store in advance. If a forward reproduction-position skip instruction has been accepted and if the clocked backward skip-operation elapse time has exceeded a predetermined time, then the first skip time stored beforehand is chosen as the forward reproduction-position skip time. On the other hand, if the forward reproduction-position skip instruction has been accepted and if the clocked backward skip-operation elapse time has not exceeded the predetermined time, then the second skip time stored beforehand is chosen as the forward reproduction-position skip time.

Therefore, after a backward skip instruction was given, if an instruction for a forward skip has been given within a predetermined time, then a second skip time is determined on which is shorter than in the case where a forward skip instruction has been given after the predetermined time or more has elapsed. Therefore, in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

In addition, in the above described reproduction apparatus, it is preferable that: the reproduction apparatus further include, a forward skip-operation elapse-time clocking means for clocking the time which elapses after the last instruction is given for the forward reproduction-position skip, a backward skip-operation elapse-time clocking means for clocking the time which elapses after the last instruction is given for the backward reproduction-position skip, and a deciding means for deciding whether or not the elapse time clocked by the backward skip-operation elapse-time clocking means has exceeded a predetermined time, if the skip-operation accepting means accepts the forward reproduction-position skip instruction, and deciding whether or not the elapse time clocked by the forward skip-operation elapse-time clocking means has exceeded a predetermined time, if the skip-operation accepting means accepts the backward reproduction-position skip instruction; and if the deciding means decides that the predetermined time has elapsed, the skip-time determining means determine a predetermined first skip time, and if the deciding means decides that the predetermined time had not elapsed, the skip-time determining means determine a second skip time shorter than the first skip time.

According to this configuration, the time is clocked which has passed since an instruction for a forward reproduction-position skip was last given and the time is clocked which has passed since an instruction for a backward reproduction-position skip was last given. If an instruction is accepted for a forward reproduction-position skip, a decision is made whether or not the time which has elapsed since the backward reproduction-position skip instruction was last given has exceeded a predetermined time. Then, if an instruction is accepted for a backward reproduction-position skip, a decision is made whether or not the time which has elapsed since the forward reproduction-position skip instruction was last given has exceeded a predetermined time. If the decision is made that the elapse time has exceeded the predetermined time, the skip time is determined for the predetermined first skip time. On the other hand, if the decision is made that it has not exceeded the predetermined time, the skip time is determined for the second skip time shorter than the first skip time.

Therefore, after a forward or backward skip instruction was given, if an instruction has been given for a skip in the direction opposite to the preceding instruction within a predetermined time, then the second skip time is determined on which is shorter than in the case where an instruction has been given for a skip in the direction opposite to the preceding instruction after the predetermined time or more has elapsed.

Therefore, in the case where a user executes a backward skip to watch the part which the user wants to view from its beginning after the user executes a forward skip to skip the part which the user does not want to view, or in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Furthermore, in the above described reproduction apparatus, preferably: the reproduction apparatus should further include, a first skip-time storing means for storing the predetermined first skip time in advance, and a second skip-time storing means for storing in advance the second skip time shorter than the first skip time; and the skip-time determining means, if the skip-operation accepting means accepts the forward reproduction-position skip instruction and if the backward skip-operation elapse time clocked by the backward skip-operation elapse-time clocking means has exceeded the predetermined time, then should choose the first skip time stored in advance in the first skip-time storing means as the forward reproduction-position skip time, if the skip-operation accepting means accepts the forward reproduction-position skip instruction and if the backward skip-operation elapse time clocked by the backward skip-operation elapse-time clocking means has not exceeded the predetermined time, then should choose the second skip time stored in advance in the second skip-time storing means as the forward reproduction-position skip time, if the skip-operation accepting means accepts the backward reproduction-position skip instruction and if the forward skip-operation elapse time clocked by the forward skip-operation elapse-time clocking means has exceeded the predetermined time, then should choose the first skip time stored in advance in the first skip-time storing means as the backward reproduction-position skip time, and if the skip-operation accepting means accepts the backward reproduction-position skip instruction and if the forward skip-operation elapse time clocked by the forward skip-operation elapse-time clocking means has not exceeded the predetermined time, then should choose the second skip time stored in advance in the second skip-time storing means as the backward reproduction-position skip time.

According to this configuration, the predetermined first skip time is store in advance, and the second skip time which is shorter than the first skip time is store in advance. If a forward reproduction-position skip instruction has been accepted and if the clocked backward skip-operation elapse time has exceeded a predetermined time, then the first skip time stored beforehand is chosen as the forward reproduction-position skip time. On the other hand, if the forward reproduction-position skip instruction has been accepted and if the clocked backward skip-operation elapse time has not exceeded the predetermined time, then the second skip time stored beforehand is chosen as the forward reproduction-position skip time. Further, if a backward reproduction-position skip instruction has been accepted and if the clocked forward skip-operation elapse time has exceeded a predetermined time, then the first skip time stored beforehand is chosen as the backward reproduction-position skip time. Still further, if the backward reproduction-position skip instruction has been accepted and if the clocked forward skip-operation elapse time has not exceeded the predetermined time, then the second skip time stored beforehand is chosen as the backward reproduction-position skip time.

Accordingly, after a forward skip instruction was given, if an instruction for a backward skip has been given within a predetermined time, then a second skip time is determined on which is shorter than in the case where a backward skip instruction has been given after the predetermined time or more has elapsed. Therefore, in the case where a user executes a backward skip to watch the part which the user wants to view from its beginning after the user executes a forward skip to skip the part which the user does not want to view, the skip is executed for a shorter skip time. This makes it possible to shorten the waiting time until this part's head is reproduced. On the other hand, after a backward skip instruction was given, if an instruction for a forward skip has been given within a predetermined time, then a second skip time is determined on which is shorter than in the case where a forward skip instruction has been given after the predetermined time or more has elapsed. Therefore, in the case where a user executes a forward skip to watch the part which the user wants to view from its beginning after the user executes a backward skip to return to a position before the part which the user wants to view, the skip is executed for a shorter skip time. This makes it possible to shorten the waiting time until this part's head is reproduced.

Moreover, in the above described reproduction apparatus, it is preferable that: the reproduction apparatus further include, a skip-direction storing means for storing the skip direction accepted last by the skip-operation accepting means, and a skip-number storing means for storing the number of times at which the skip-time determining means determines the second skip time repeatedly; and the skip-time determining means, determine the second skip time, if the deciding means decides that the predetermined time had not elapsed and if the instruction accepted by the skip-operation accepting means indicates the opposite direction to the skip direction stored in the skip-direction storing means, determine the second skip time, if the deciding means decides that the predetermined time had not elapsed, if the instruction accepted by the skip-operation accepting means indicates the same direction as the skip direction stored in the skip-direction storing means and if the number of times stored in the skip-number storing means at which the second skip time is repeatedly determined has not reached a predetermined number of times, determine the first skip time, if the deciding means decides that the predetermined time had elapsed, and determine the first skip time, if the deciding means decides that the predetermined time had not elapsed, if the instruction accepted by the skip-operation accepting means indicates the same direction as the skip direction stored in the skip-direction storing means and if the number of times stored in the skip-number storing means at which the second skip time is repeatedly determined has reached a predetermined number of times.

According to this configuration, the last-accepted skip direction is stored, and the number of times at which the second skip time has been continuously determined is stored. Then, if the decision is made that the elapse time after an instruction was last given for the skip toward the opposite direction to the skip direction accepted this time has not exceeded the predetermined time and if the accepted instruction is for the direction opposite to the stored skip direction, the second skip time is chosen. On the other hand, if the decision is made that the elapse time after an instruction was last given for the skip toward the opposite direction to the skip direction accepted this time has not exceeded the predetermined time, if the accepted instruction is for the same direction as the stored skip direction and if the stored number of times at which the second skip time has been continuously determined has not reached the predetermined number of times, then the second skip time is chosen. Further, if the decision is made that the elapse time after an instruction was last given for the skip toward the opposite direction to the skip direction accepted this time has exceeded the predetermined time, then the first skip time is determined on. Still further, if the decision is made that the elapse time after an instruction was last given for the skip toward the opposite direction to the skip direction accepted this time has not exceeded the predetermined time, if the accepted instruction is for the same direction as the stored skip direction and if the stored number of times at which the second skip time has been continuously determined has reached the predetermined number of times, then the first skip time is chosen.

Accordingly, after a forward or backward skip instruction was given, if an instruction has been given for a skip in the direction opposite to the preceding one within a predetermined time, then a second skip time is determined on which is shorter than in the case where an instruction has been given for a skip in the direction opposite to the preceding one after the predetermined time or more has elapsed. In contrast, if a skip operation has been continuously executed over the second skip time at the predetermined number of times or more times in the same direction, a skip operation is executed over a first skip time which is longer than the second skip time. Therefore, even if the head of the part which the user wants to view is located farther than the position at the time when the skip operation has been continuously executed over the second skip time at the predetermined number of times in the same direction, then the reproduction position can be quickly moved to the head of the part which the user wants to watch.

In addition, in the above described reproduction apparatus, preferably: a reproduction-time clocking means should be further provided for clocking the reproduction time from the last skip-operation completion time to the next skip-operation start time; and if the next skip operation is the forward reproduction-position skip, the skip-time determining means should determine, as the skip time, the time which is obtained by subtracting the reproduction time clocked by the reproduction-time clocking means from either skip time of the first skip time and the second skip time.

According to this configuration, the reproduction time is clocked from the last skip-operation completion time to the next skip-operation start time. If the next skip operation is a forward reproduction-position skip, the time which is obtained by subtracting the clocked reproduction time from either skip time of the first skip time and the second skip time is determined on as the skip time. Therefore, the skip time can be determined, taking into account the reproduction time which a user takes to confirm whether a skip has been executed to the part which the user wants to view.

Furthermore, in the above described reproduction apparatus, it is preferable that: a reproduction-time clocking means be further provided for clocking the reproduction time from the last skip-operation completion time to the next skip-operation start time; and if the next skip operation is the backward reproduction-position skip, the skip-time determining means determine, as the skip time, the time which is obtained by adding the reproduction time clocked by the reproduction-time clocking means to either skip time of the first skip time and the second skip time.

According to this configuration, the reproduction time is clocked from the last skip-operation completion time to the next skip-operation start time. If the next skip operation is a backward reproduction-position skip, the time which is obtained by adding the clocked reproduction time to either skip time of the first skip time and the second skip time is determined on as the skip time. Therefore, the skip time can be determined, taking into account the reproduction time which a user takes to confirm whether a skip has been executed to the part which the user wants to view.

The reproduction apparatus according to the present invention has the function of executing a swift and precise skip to a targeted reproduction position, using a simple operation. Hence, it is useful as a skip method for a reproduction apparatus which is capable of reading, reproducing and displaying information from record media such as a DVD player.

The invention claimed is:

1. A reproduction apparatus, comprising:
a reproducing means for reading information stored in a recording medium and reproducing the information;
a skip-operation accepting means for arbitrarily accepting one of an instruction for a forward reproduction-position skip and an instruction for a backward reproduction-position skip;
a skip-time determining means for making a skip time for one of the forward reproduction-position skip and the backward reproduction-position skip longer than the skip time for another of the forward reproduction-position skip and the backward reproduction-position skip, and determining the skip time for one of the forward reproduction-position skip and the backward reproduction-position skip based on the one of the instruction for the forward reproduction-position skip and the instruction for the backward reproduction-position skip accepted by the skip-operation accepting means;
a controlling means for, when the skip-operation accepting means accepts one of the instruction for the forward reproduction-position skip and the instruction for the backward reproduction-position skip during a reproduction by the reproducing means, stopping the reproduction by the reproducing means, moving a reading position, from which the reproducing means reads the information from the recording medium, by the skip time determined, for the one of the forward reproduction-position skip and the backward reproduction-position skip, by the skip-time determining means, and resuming the reproduction after the moving of the reading position is completed;
a forward skip-operation elapse-time clocking means for clocking an elapsed time that has elapsed since a last instruction has been accepted for the forward reproduction-position skip; and
a backward-skip deciding means for deciding whether or not the elapsed time clocked by the forward skip-operation elapse-time clocking means has exceeded a predetermined time, when the skip-operation accepting means accepts the instruction for the backward reproduction-position skip,
wherein, when the backward-skip deciding means decides that the elapsed time exceeds the predetermined time, the skip-time determining means determines a predetermined first skip time, and
wherein, when the backward-skip deciding means decides that the elapsed time does not exceed the predetermined time, the skip-time determining means determines a second skip time that is shorter than the first skip time.

2. The reproduction apparatus according to claim 1, wherein, when the skip-operation accepting means accepts the one of the instruction for the forward reproduction-position skip and the instruction for the backward reproduction-position skip during a temporary stop by the reproducing means, the controlling means moves the reading position from which the reproducing means reads the information from the recording medium by the skip time determined, for the one of the forward reproduction-position skip and the backward reproduction-position skip, by the skip-time determining means, and reproduces only first information from the reading position after the moving of the reading position.

3. The reproduction apparatus according to claim 1, wherein the reproduction apparatus further includes:
a forward skip-time storing means for storing the skip time for the forward reproduction-position skip time in advance; and
a backward skip-time storing means for storing the skip time for the backward reproduction-position skip in advance;
wherein, when the skip-operation accepting means accepts the instruction for the forward reproduction-position skip, the skip-time determining means chooses the skip time for the forward reproduction-position skip stored in the forward skip-time storing means, and
wherein, when the skip-operation accepting means accepts the instruction for the backward reproduction-position skip, the skip-time determining means chooses the skip time for the backward reproduction-position skip stored in the backward skip-time storing means.

4. The reproduction apparatus according to claim 3, wherein the forward skip-time storing means stores, in advance, the skip time for the forward reproduction-position skip, which is a greater value than the skip time for the backward reproduction-position skip stored, in advance, in the backward skip-time storing means.

5. The reproduction apparatus according to claim 3, wherein the backward skip-time storing means stores, in advance, the skip time for the backward reproduction-position skip which is a greater value than the skip time for the forward reproduction-position skip stored, in advance, in the forward skip-time storing means.

6. The reproduction apparatus according to claim 1, characterized in that:
wherein the reproduction apparatus further includes:
a first skip-time storing means for storing the predetermined first skip time in advance; and
a second skip-time storing means for storing, in advance, the second skip time that is shorter than the first skip time,
wherein, when the skip-operation accepting means accepts the instruction for the backward reproduction-position skip and when the elapsed time clocked by the forward skip-operation elapse-time clocking means exceeds the predetermined time, the skip-time determining means chooses the first skip time stored in advance in the first skip-time storing means as the skip time for the backward reproduction-position skip, and
wherein, when the skip-operation accepting means accepts the instruction for the backward reproduction-position skip and when the elapsed time clocked by the forward skip-operation elapse-time clocking means does not exceed the predetermined time, the skip-time determining means chooses the second skip time stored in advance in the second skip-time storing means as the skip time for the backward reproduction-position skip.

7. The reproduction apparatus according to claim 1, wherein the reproduction apparatus further include;
a backward skip-operation elapse-time clocking means for clocking a backward elapsed time that has elapsed since a last instruction has been accepted for the backward reproduction-position skip; and a forward-skip deciding means for deciding whether or not the backward elapsed time clocked by the backward skip-operation elapse-time clocking means has exceeded the predetermined time, when the skip-operation accepting means accepts the instruction for the forward reproduction-position skip instruction, wherein, when the forward-skip deciding means decides that the backward elapsed time exceeds the predetermined time, the skip-time determining means determines the predetermined first skip time, and wherein, when the forward-skip deciding means decides that the backward elapsed time does not exceed the predetermined time, the skip-time determining means determines the second skip time that is shorter than the first skip time.

8. The reproduction apparatus according to claim 7, wherein the reproduction apparatus further includes:

a first skip-time storing means for storing the predetermined first skip time in advance; and a second skip-time storing means for storing, in advance, the second skip time that is shorter than the first skip time;

wherein, when the skip-operation accepting means accepts the instruction for the forward reproduction-position skip and when the backward elapsed time clocked by the backward skip-operation elapse-time clocking means exceeds the predetermined time, the skip-time determining means chooses the first skip time stored in advance in the first skip-time storing means as the skip time for the forward reproduction-position skip, and wherein, when the skip-operation accepting means accepts the instruction for the forward reproduction-position skip and when the backward elapsed time clocked by the backward skip-operation elapse-time clocking means does not exceed the predetermined time, the skip-time determining means chooses the second skip time stored in advance in the second skip-time storing means as the skip time for the forward reproduction-position skip.

9. The reproduction apparatus according to claim 1, wherein the reproduction apparatus further includes:

a skip-direction storing means for storing a skip direction last accepted by the skip-operation accepting means; and a skip-number storing means for storing a number of times that the skip-time determining means has repeatedly determined the second skip time, wherein, the skip-time determining means determines the second skip time, when the backward-skip deciding means decides that the elapsed time does not exceed the predetermined time and when the instruction accepted by the skip-operation accepting means indicates a skip direction that is opposite to the skip direction stored in the skip-direction storing means, wherein the skip-time determining means determines the second skip time, when the backward-skip deciding means decides that the elapsed time does not exceed the predetermined time, when the instruction accepted by the skip-operation accepting means indicates a same skip direction as the skip direction stored in the skip-direction storing means and when the number of times stored in the skip-number storing means has not reached a predetermined number of times, wherein the skip-time determining means determines the first skip time, when the backward-skip deciding means decides that the elapsed time exceeds the predetermined time, and wherein the skip-time determining means determines the first skip time, when the backward-skip deciding means decides that the elapsed time does not exceed the predetermined time, when the instruction accepted by the skip-operation accepting means indicates the same skip direction as the skip direction stored in the skip-direction storing means and when the number of times stored in the skip-number storing means has reached the predetermined number of times.

10. The reproduction apparatus according to claim 1, wherein a reproduction-time clocking means is further provided for clocking a reproduction time from a last skip-operation completion time to a next skip-operation start time, and wherein, when the next skip operation is the forward reproduction-position skip, the skip-time determining means determines, as the skip time for the one of the forward reproduction-position skip and the backward reproduction-position skip, a time which is obtained by subtracting the reproduction time clocked by the reproduction-time clocking means from one of the first skip time and the second skip time.

11. The reproduction apparatus according to claim 7, wherein a reproduction-time clocking means is further provided for clocking a reproduction time from a last skip-operation completion time to a next skip-operation start time, and wherein, when the next skip operation is the forward reproduction-position skip, the skip-time determining means determines, as the skip time for the one of the forward reproduction-position skip and the backward reproduction-position skip, a time which is obtained by subtracting the reproduction time clocked by the reproduction-time clocking means from one of the first skip time and the second skip time.

12. The reproduction apparatus according to claim 1, wherein a reproduction-time clocking means is further provided for clocking a reproduction time from a last skip-operation completion time to a next skip-operation start time, and wherein, when the next skip operation is the backward reproduction-position skip, the skip-time determining means determines, as the skip time for the one of the forward reproduction-position skip and the backward reproduction-position skip, a time which is obtained by adding the reproduction time clocked by the reproduction-time clocking means to one of the first skip time and the second skip time.

13. The reproduction apparatus according to claim 7, wherein a reproduction-time clocking means is further provided for clocking a reproduction time from a last skip-operation completion time to a next skip-operation start time, and wherein, when the next skip operation is the backward reproduction-position skip, the skip-time determining means determines, as the skip time for the one of the forward reproduction-position skip and the backward reproduction-position skip, a time which is obtained by adding the reproduction time clocked by the reproduction-time clocking means to one of the first skip time and the second skip time.

14. A reproduction method, comprising:

a reproducing step of reading information stored in a recording medium and reproducing the information;

a skip-operation accepting step of arbitrarily accepting one of an instruction for a forward reproduction-position skip and an instruction for a backward reproduction-position skip;

a skip-time determining step of making a skip time for one of the forward reproduction-position skip and the backward reproduction-position skip longer than the skip time for another of the forward reproduction-position skip and the backward reproduction-position skip, and determining the skip time for one of the forward reproduction-position skip and the backward reproduction-position skip based on the one of the instruction for the forward reproduction-position skip and the instruction for the backward reproduction-position skip accepted in the skip-operation accepting step;

a controlling step of, when one of the instruction for the forward reproduction-position skip and the instruction for the backward reproduction-position skip is accepted during a reproduction performed by the reproducing step, stopping the reproduction performed by the reproducing step, moving a reading position, from which the reproducing step reads the information from the recording medium, by the skip time determined, for the one of the forward reproduction-position skip and the backward reproduction-position skip, in the skip-time determining step, and resuming the reproduction after the moving of the reading position is completed;

a forward skip-operation elapse-time clocking step of clocking an elapsed time that has elapsed since a last instruction has been accepted for the forward reproduction-position skip; and a backward-skip deciding step of deciding whether or not the elapsed time clocked in the forward skip-operation elapse-time clocking step has exceeded a predetermined time, when the skip-operation accepting step accepts the instruction for the backward reproduction-position skip, wherein, when the backward-skip deciding step decides that the elapsed time exceeds the predetermined time, the skip-time determining step determines a predetermined first skip time, and wherein, when the backward-skip deciding step decides that the elapsed time does not exceed the predetermined time, the skip-time determining step determines a second skip time that is shorter than the first skip time.

15. A non-transitory computer-readable recording medium having a reproduction program recorded thereon, the reproduction program causing a computer to function as:

a reproducing means for reading information stored in a recording medium and reproducing the information;

a skip-operation accepting means for arbitrarily accepting one of an instruction for a forward reproduction-position skip and an instruction for a backward reproduction-position skip;

a skip-time determining means for making a skip time for one of the forward reproduction-position skip and the backward reproduction-position skip longer than the skip time for another of the forward reproduction-position skip and the backward reproduction-position skip, and determining the skip time for one of the forward reproduction-position skip and the backward reproduction-position skip based on the one of the instruction for the forward reproduction-position skip and the instruction for the backward reproduction-position skip accepted by the skip-operation accepting means;

a controlling means for, when the skip-operation accepting means accepts one of the instruction for the forward reproduction-position skip and the instruction for the backward reproduction-position skip during a reproduction by the reproducing means, stopping the reproduction by the reproducing means, moving a reading position, from which the reproducing means reads the information from the recording medium, by the skip time determined, for the one of the forward reproduction-position skip and the backward reproduction-position skip, by the skip-time determining means, and resuming the reproduction after the moving of the reading position is completed;

a forward skip-operation elapse-time clocking means for clocking an elapsed time that has elapsed since a last instruction has been accepted for the forward reproduction-position skip; and a backward-skip deciding means for deciding whether or not the elapsed time clocked by the forward skip-operation elapse-time clocking means has exceeded a predetermined time, when the skip-operation accepting means accepts the instruction for the backward reproduction-position skip, wherein, when the backward-skip deciding means decides that the elapsed time exceeds the predetermined time, the skip-time determining means determines a predetermined first skip time, and wherein, when the backward-skip deciding means decides that the elapsed time does not exceed the predetermined time, the skip-time determining means determines a second skip time that is shorter than the first skip time.

* * * * *